June 9, 1953  E. A. WILCKENS ET AL  2,641,297
APPARATUS FOR ASSEMBLING RECEPTACLE CLOSURES AND SEALS
Filed March 30, 1950  13 Sheets-Sheet 1
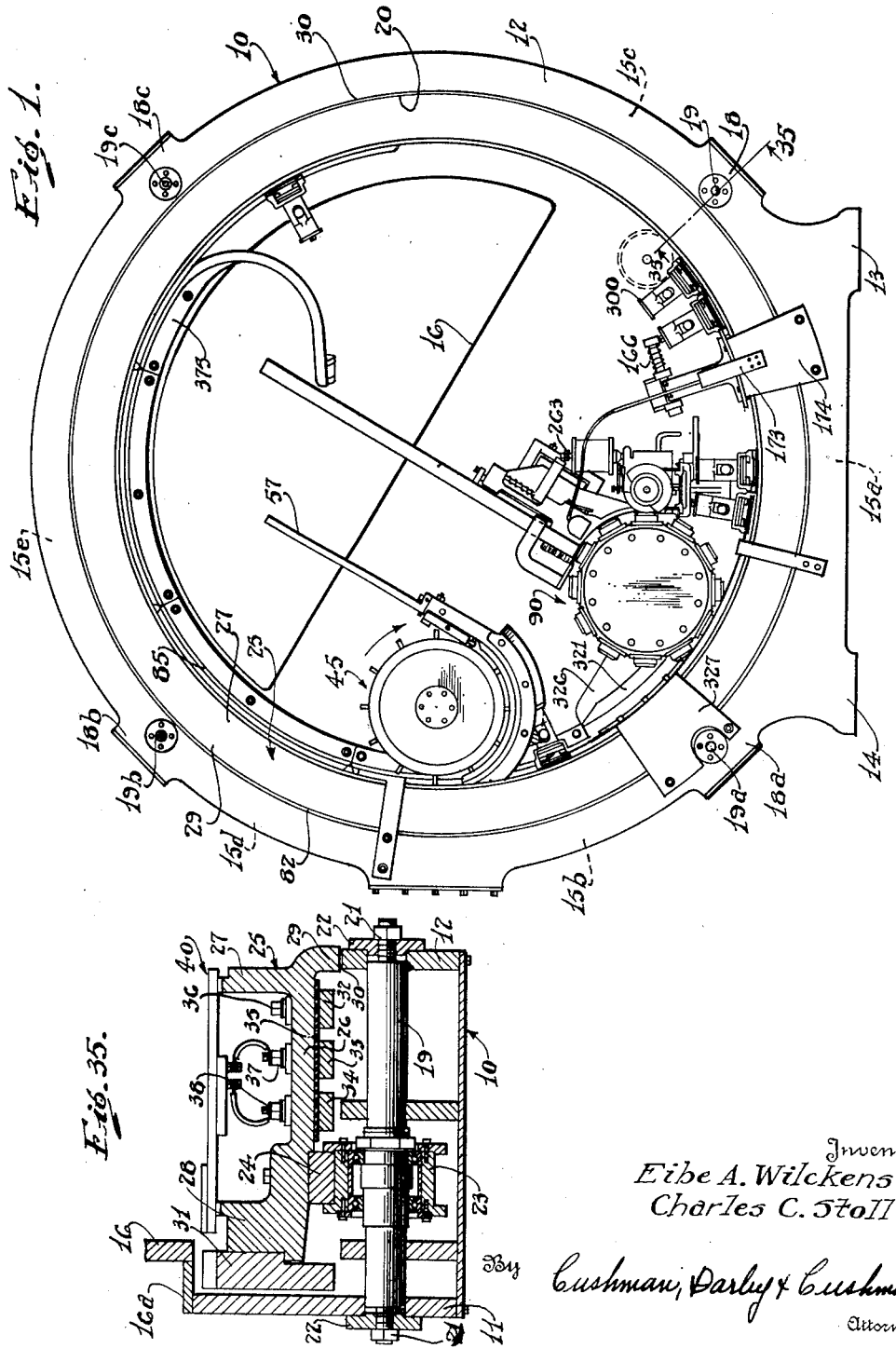
Inventors
Eibe A. Wilckens &
Charles C. Stoll
By Cushman, Darby & Cushman
Attorneys

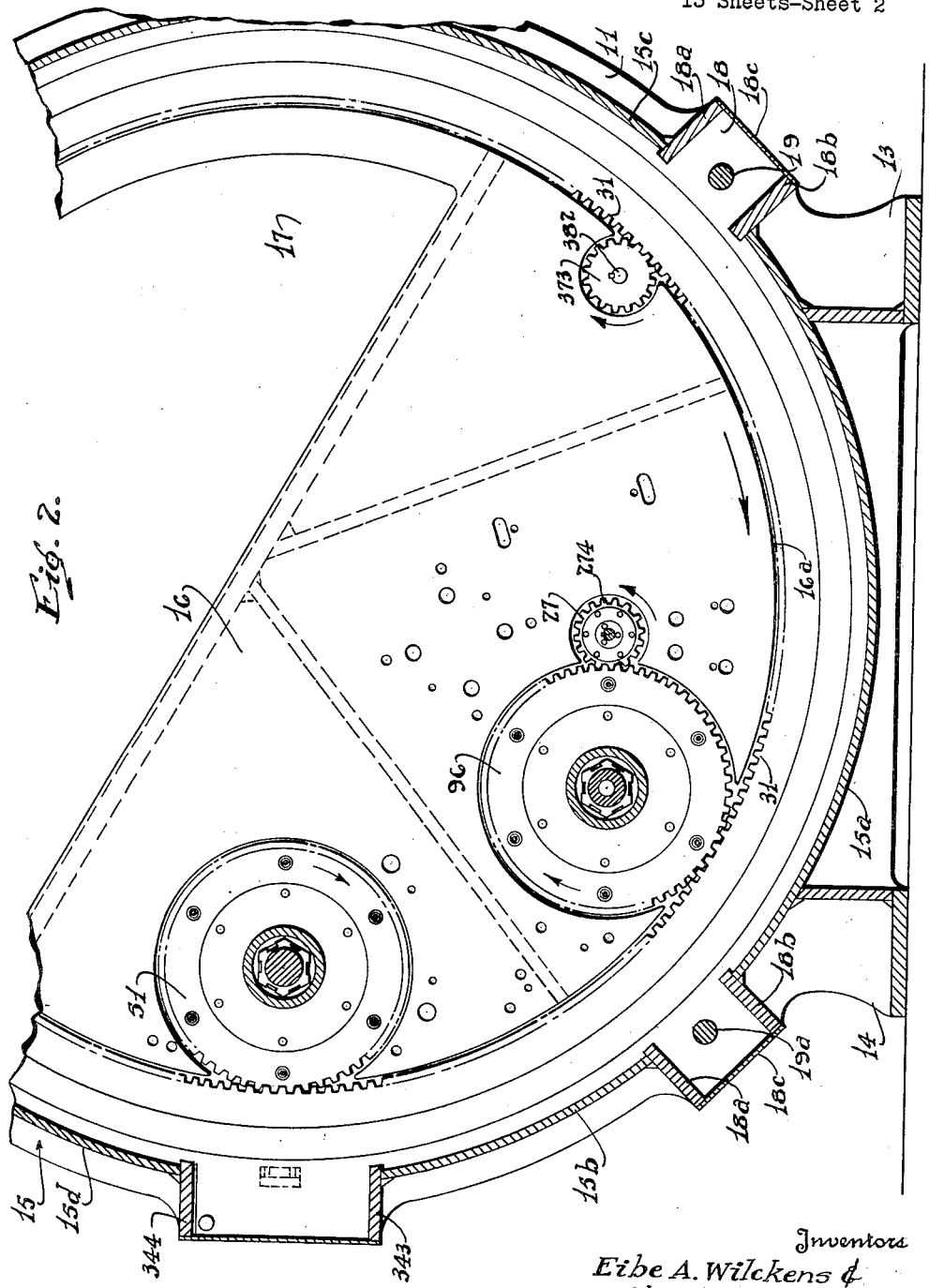

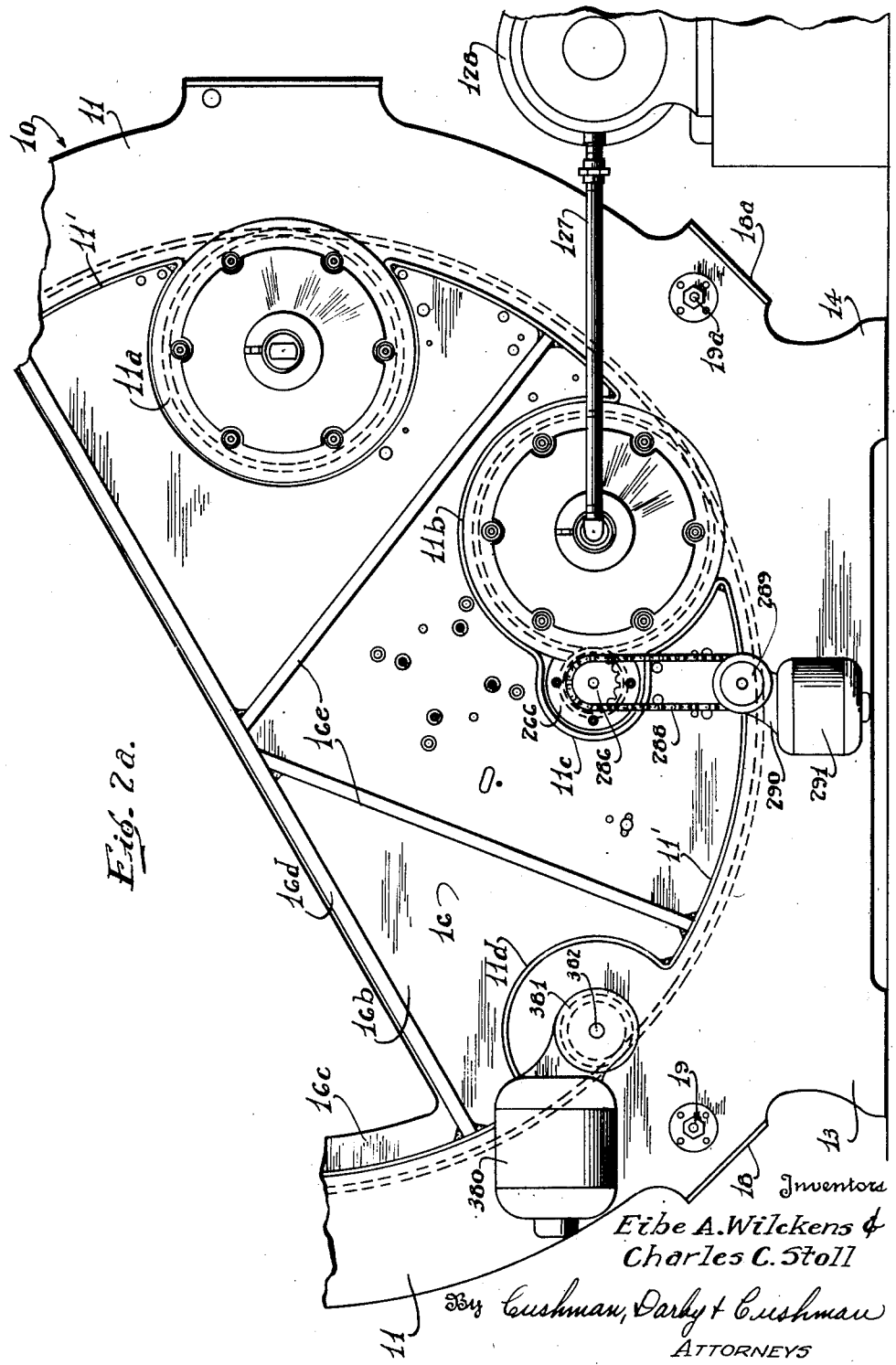

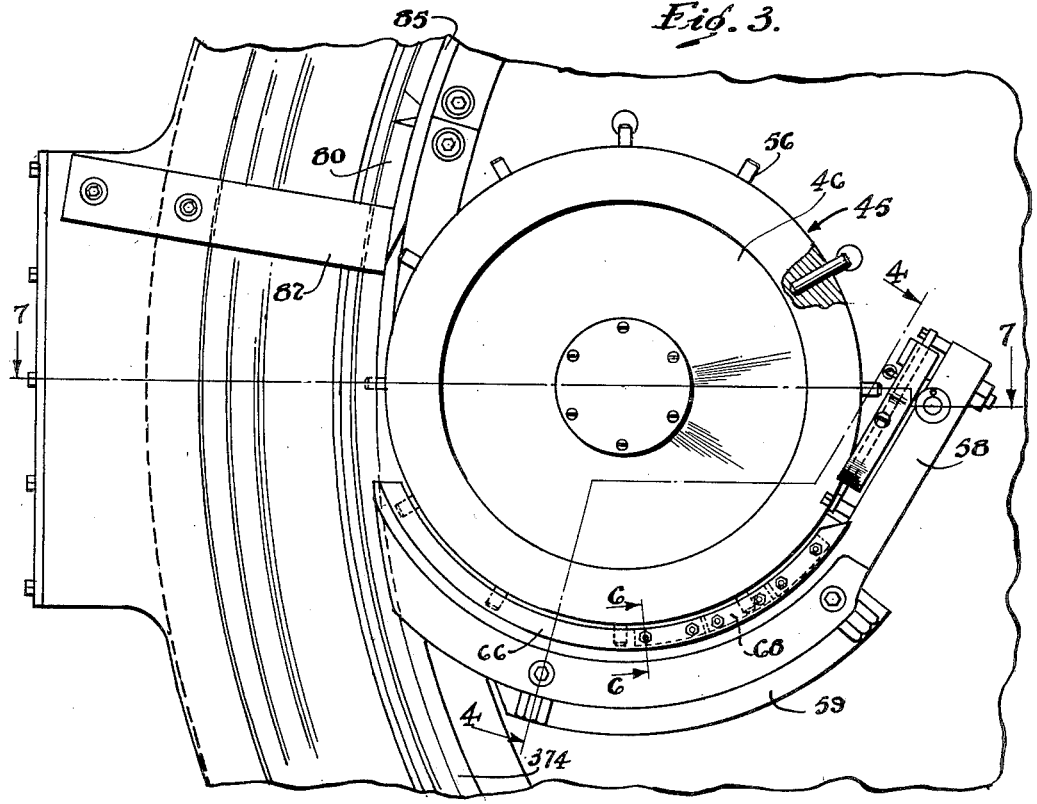
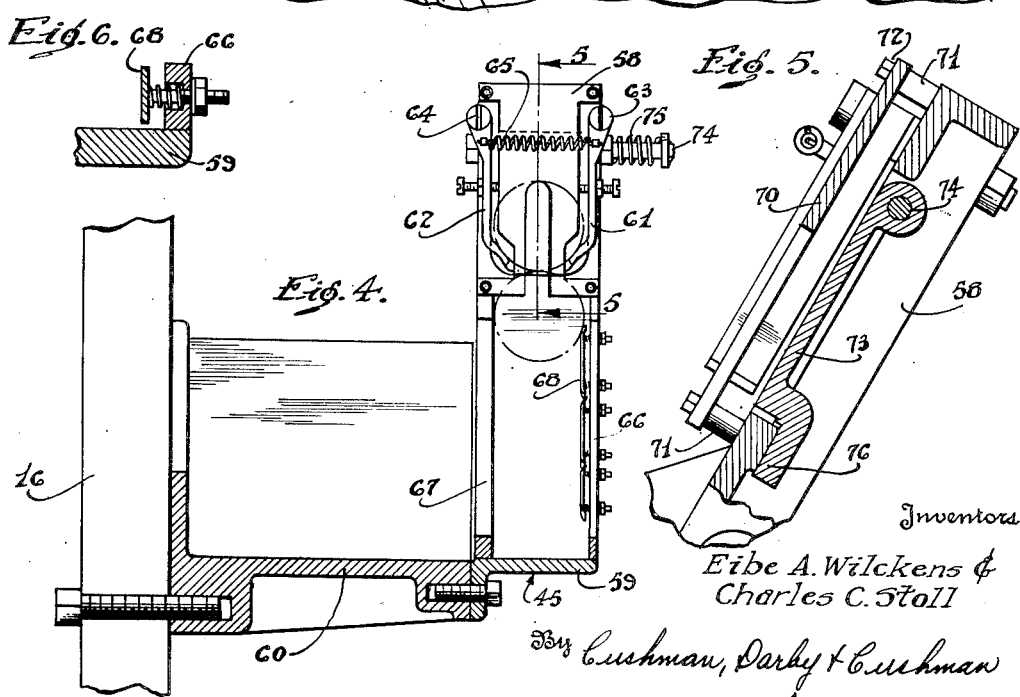

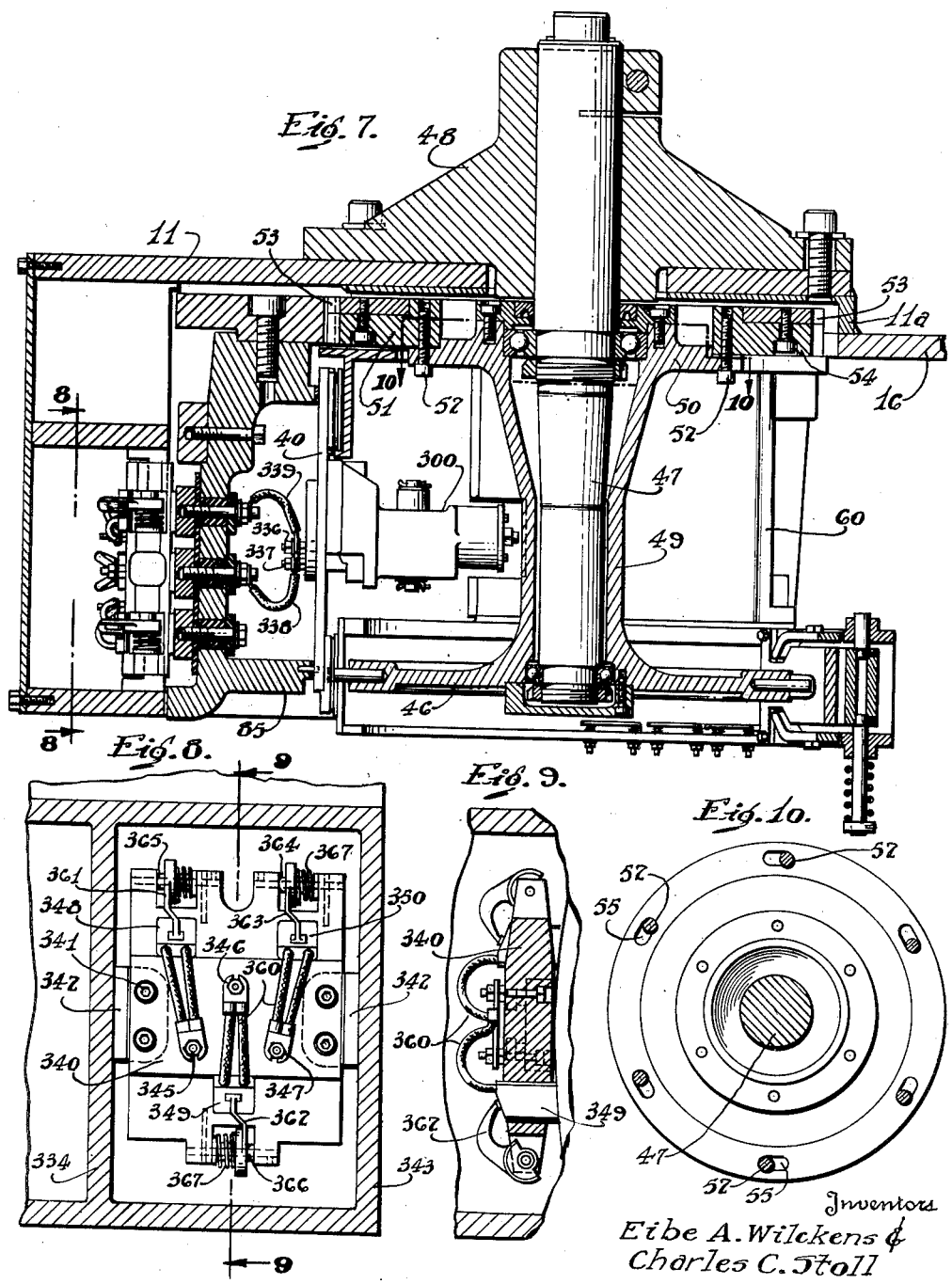

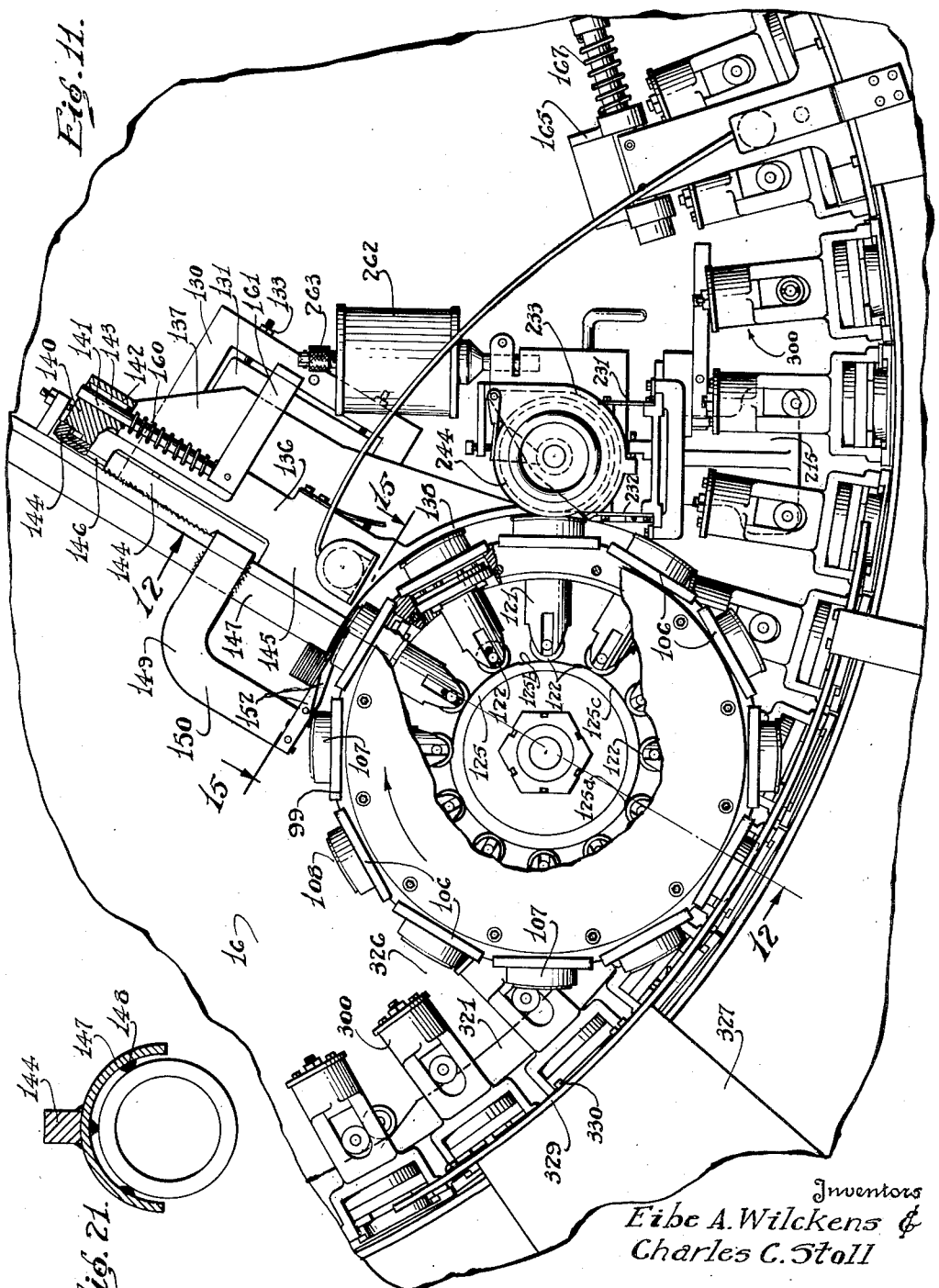

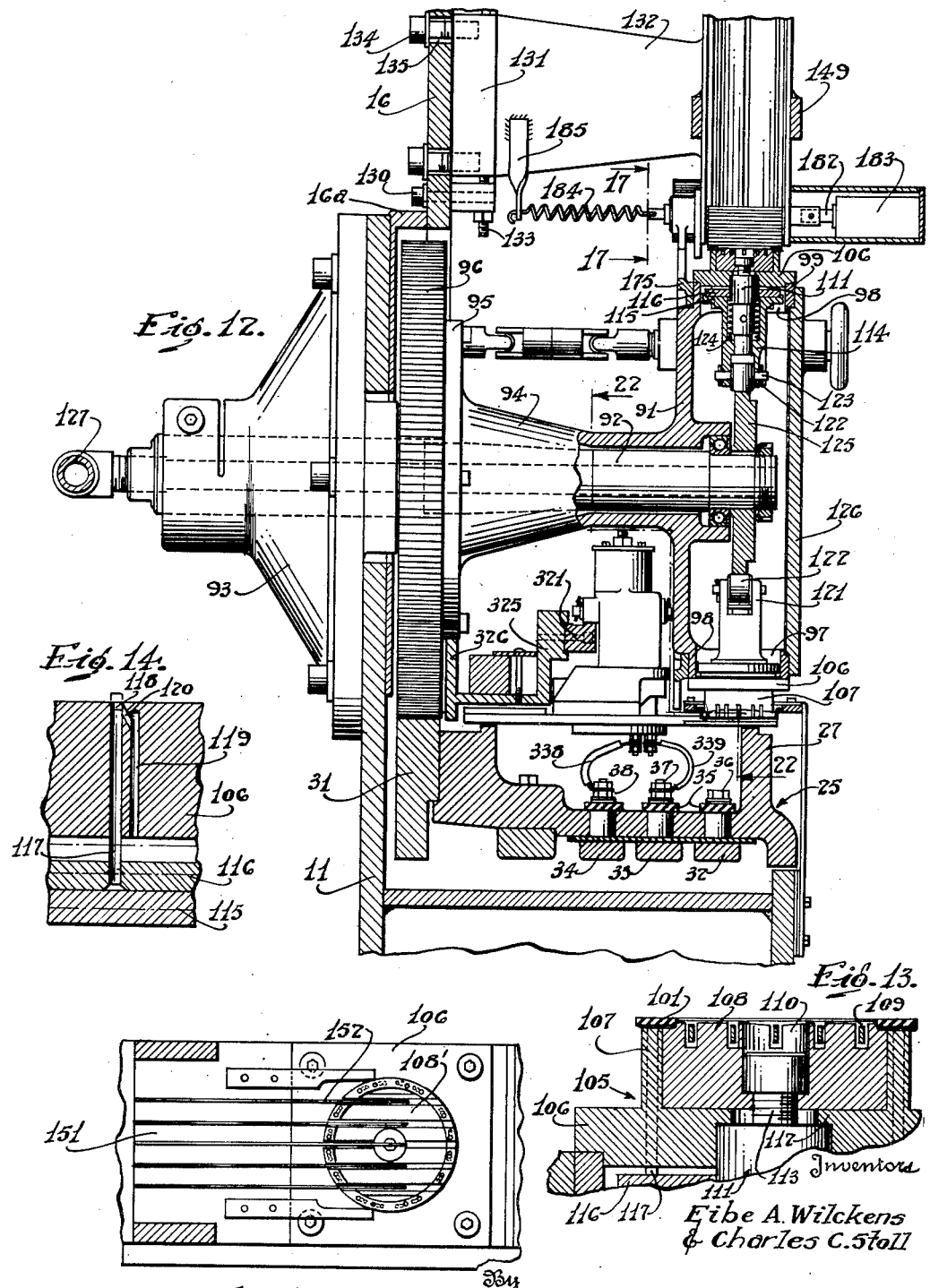

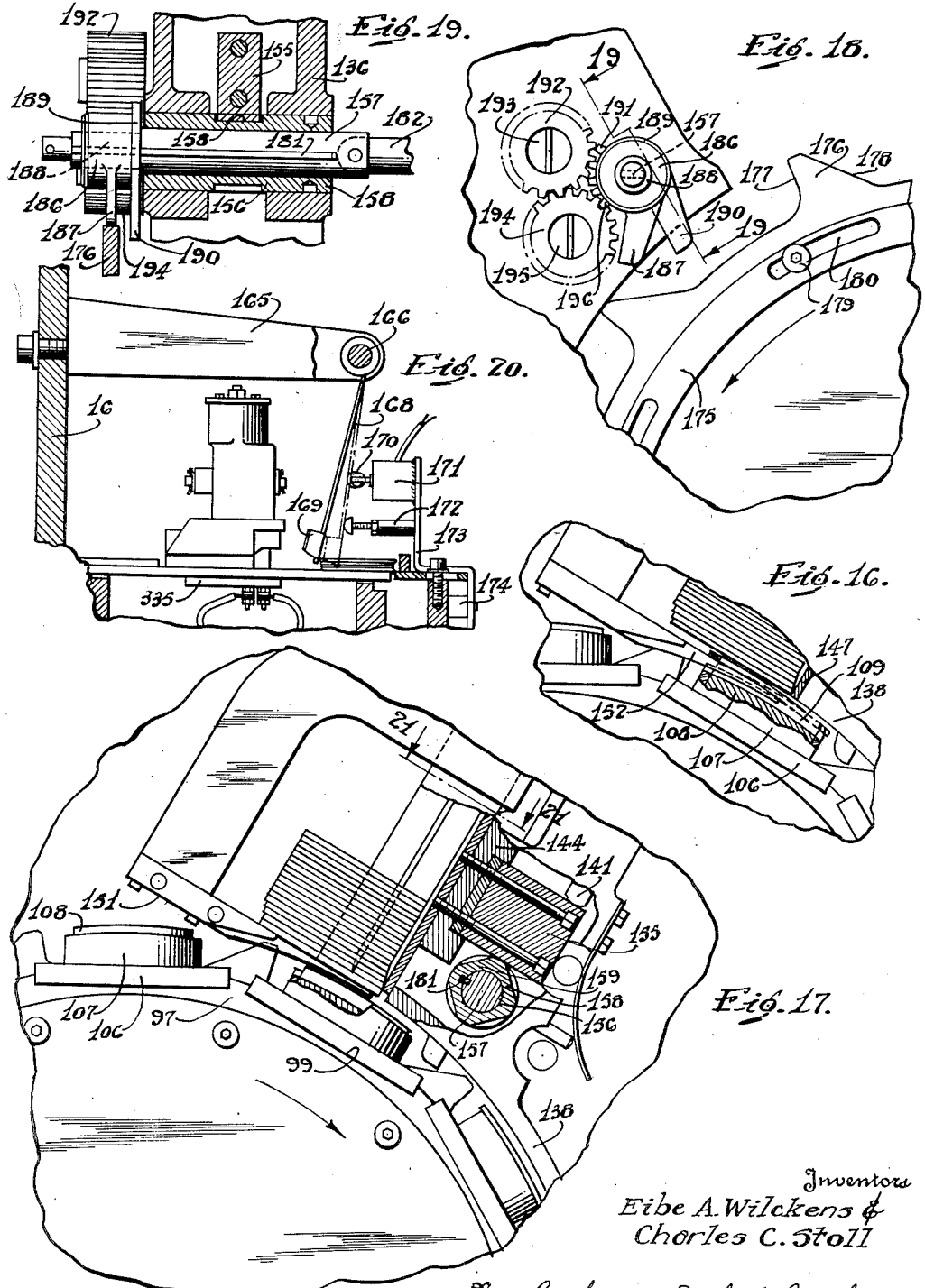

June 9, 1953  E. A. WILCKENS ET AL  2,641,297
APPARATUS FOR ASSEMBLING RECEPTACLE CLOSURES AND SEALS
Filed March 30, 1950  13 Sheets-Sheet 9
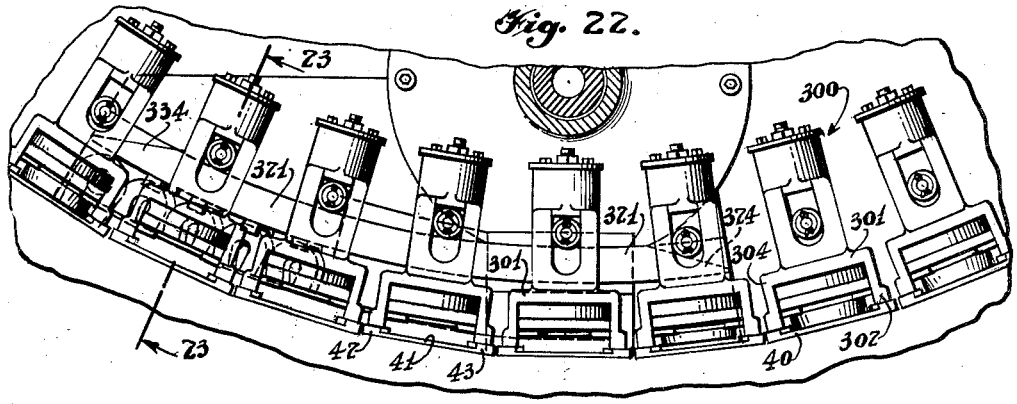
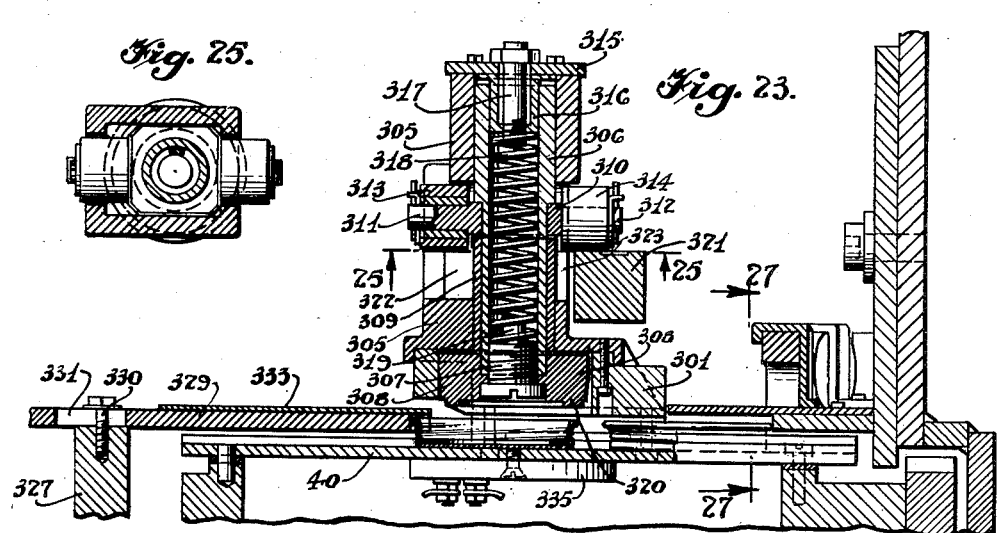
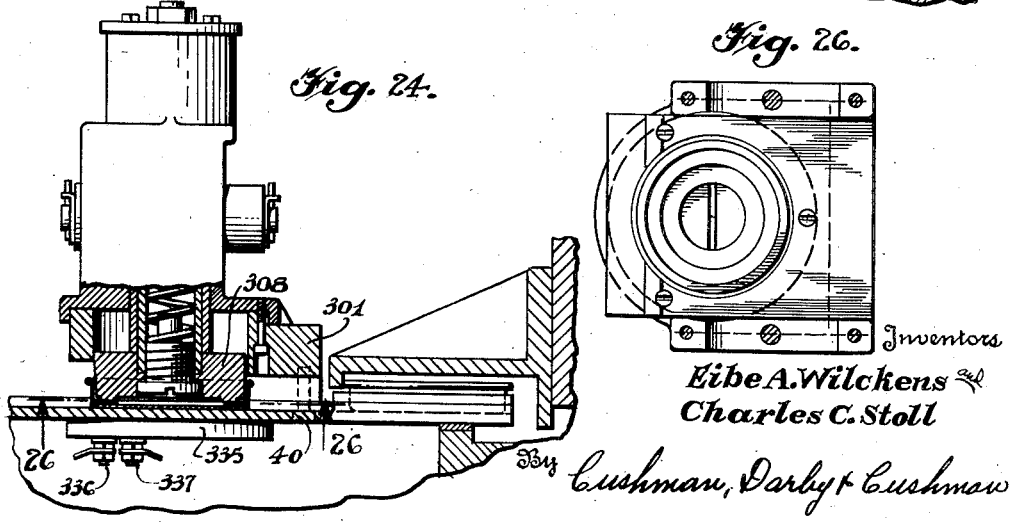
Inventors
Eibe A. Wilckens
Charles C. Stoll
By Cushman, Darby & Cushman
Attorneys June 9, 1953  E. A. WILCKENS ET AL  2,641,297
APPARATUS FOR ASSEMBLING RECEPTACLE CLOSURES AND SEALS
Filed March 30, 1950  13 Sheets-Sheet 10
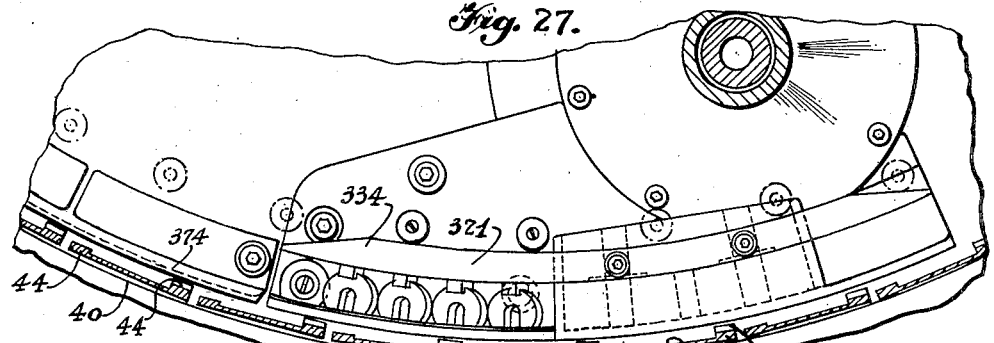
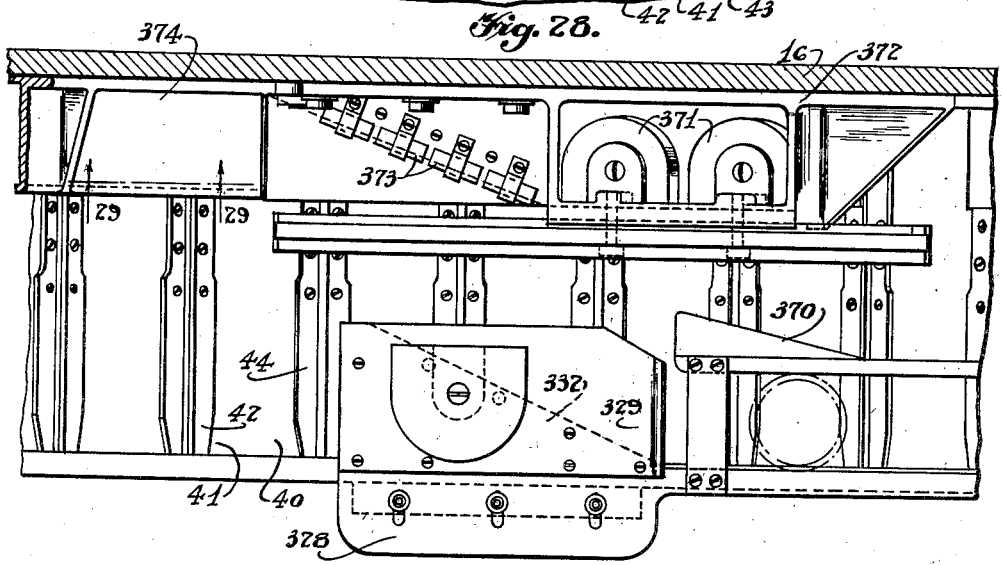
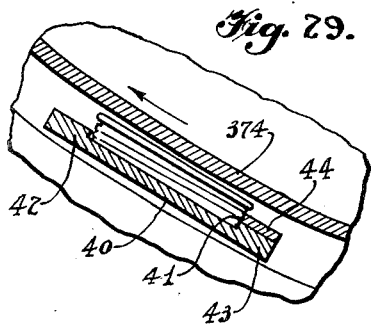
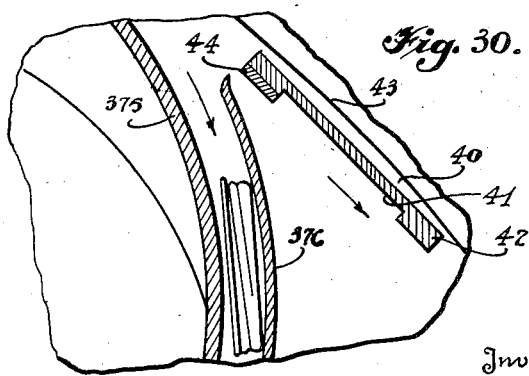
Inventors
Eibe A. Wilckens and
Charles C. Stoll
By Cushman, Darby & Cushman
Attorneys June 9, 1953  E. A. WILCKENS ET AL  2,641,297
APPARATUS FOR ASSEMBLING RECEPTACLE CLOSURES AND SEALS
Filed March 30, 1950  13 Sheets-Sheet 11

Inventors
Eibe A. Wilckens &
Charles C. Stoll

By
Cushman, Darby & Cushman
ATTORNEYS

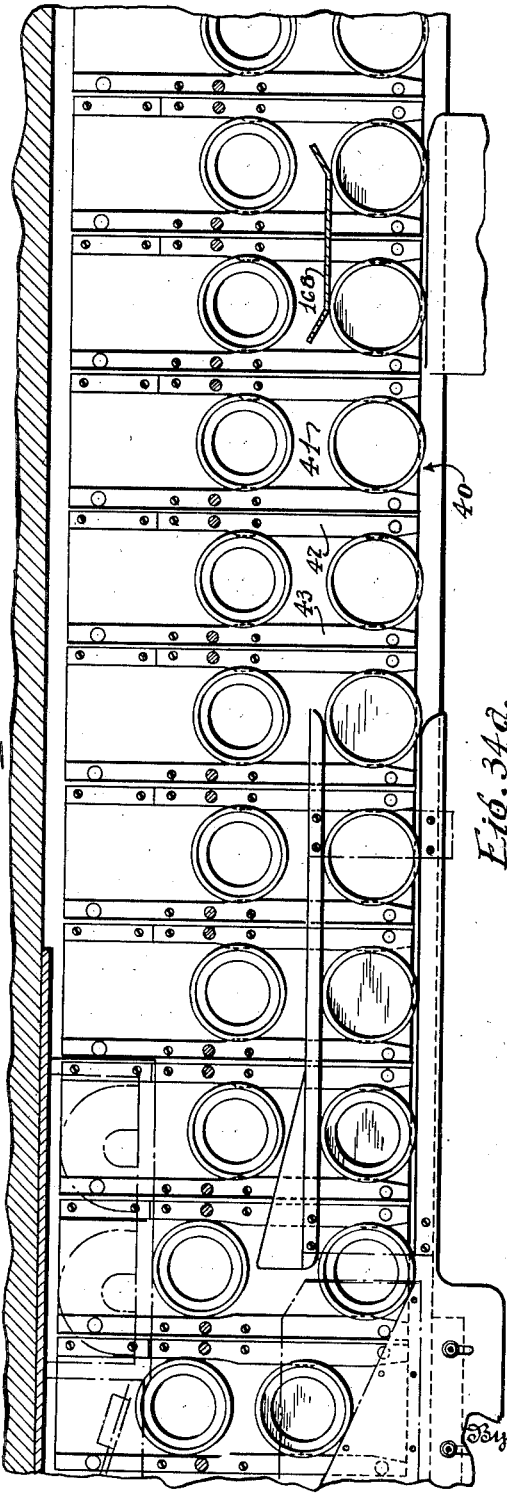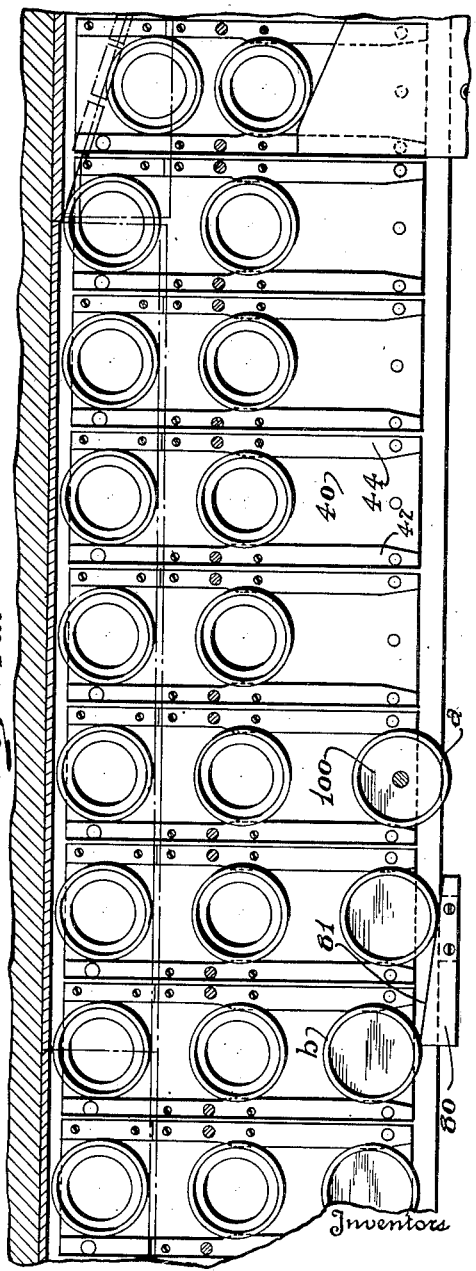

June 9, 1953 E. A. WILCKENS ET AL 2,641,297
APPARATUS FOR ASSEMBLING RECEPTACLE CLOSURES AND SEALS
Filed March 30, 1950 13 Sheets-Sheet 13
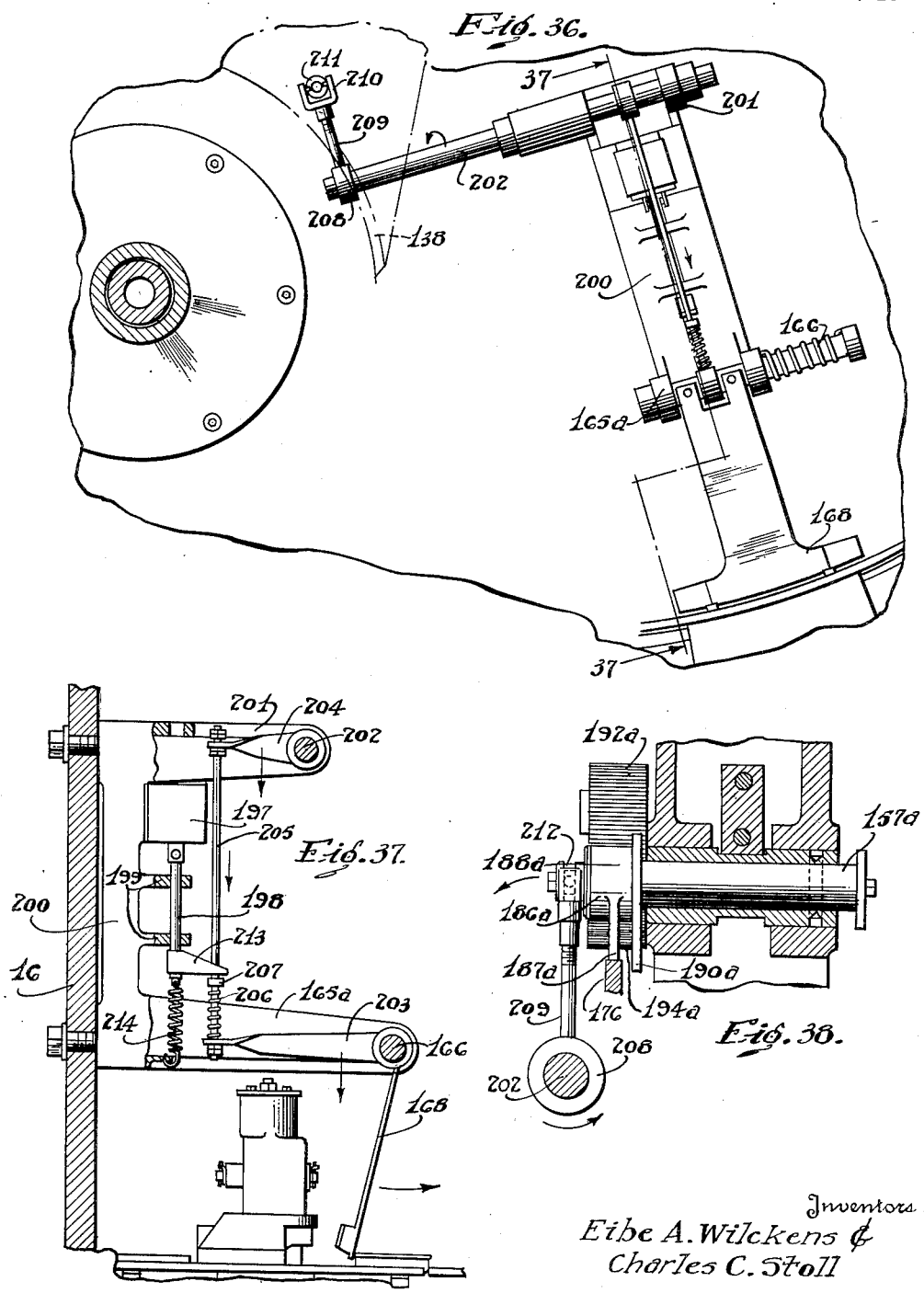
Inventors
Eibe A. Wilckens &
Charles C. Stoll
By Cushman, Darby & Cushman
Attorneys Patented June 9, 1953

2,641,297

UNITED STATES PATENT OFFICE 2,641,297

APPARATUS FOR ASSEMBLING RECEPTACLE CLOSURES AND SEALS

Eibe A. Wilckens and Charles C. Stoll, Baltimore, Md., assignors to Crown Cork & Seal Company, Inc., Baltimore, Md., a corporation of New York Application March 30, 1950, Serial No. 152,866

35 Claims. (Cl. 154—1.5)

1

The present invention relates to an apparatus for assembling in receptacle closures, such as bottle and jar caps, seals, such as ring gaskets of the type usually made of rubber or rubber composition. In the past, such rings have been inserted in the caps by hand, with resulting relatively high labor costs.

The primary object of the present invention is to provide a machine which will do this work entirely automatically, at a high rate of speed, in an efficient manner, and with a minimum of expense.

A further object of the invention is to provide a machine which will handle a continuous line of caps, delivered thereto by a suitable chute from a cap delivering apparatus of known type; which will successively take the ring gaskets from a stack, apply adhesive to their lower surfaces and deposit them successively in the continuously moving line of caps; and which will subject the rings and caps to heat and pressure for a substantial period of time, as they move along a predetermined path, to set the adhesive.

A further object of the invention is to provide improved means for delivering caps successively to the cap receiving elements associated with a main dial in the machine, where the succeeding operations are performed.

Another object is to provide improved means for separating the ring gaskets from the lower end of a stack of gaskets and for depositing the same successively in accurate position within the caps on the main dial, as the caps move past an assembly position.

Another object is to provide improved means for applying adhesive to the surfaces of the ring gaskets, between the time when they are separated from the stack and when they are deposited in the caps as noted above.

Another object of the invention is to provide improved means for rendering the ring separating, handling and adhesive applying means inoperative in the event that a cap is not present in position on the dial to receive a ring gasket.

Still another object is to provide improved means for applying heat and pressure to the caps and the rings, after the rings have been inserted in the caps, to effect setting or drying of the adhesive, so that the caps with the rings secured therein may be delivered from the machine and handled, without danger of dislodgment of the rings.

Another object is to provide improved means for handling the caps, for shifting them from the position on the dial where the rings are inserted, into operative relation to the heating and pressing devices, and for shifting them from the latter devices to a position of discharge, after the drying operation has been completed.

Other and further objects and advantages of the invention will be apparent from a consideration of the following description of certain embodiments of the invention, shown for purposes of illustration in the accompanying drawings, in which, Figure 1 is a front elevation of the apparatus, with certain parts removed for the sake of clarity;

Figure 2 is an enlarged elevation and vertical section, showing the drive for the dial and drive for the cap feed, the ring feed and the glue applicator;

Figure 2a is a fragmentary rear elevation on the same scale as Figure 2;

Figure 3 is a side elevation of the cap in-feed wheel and associated parts;

Figure 4 is a section, taken on line 4—4 of Figure 3, with the cap in-feed wheel and certain other parts omitted;

Figure 5 is a section on line 5—5 of Figure 4;

Figure 6 is a fragmentary detail, taken on line 6—6 of Figure 3;

Figure 7 is a substantially horizontal section on line 7—7 of Figure 3;

Figure 8 is an elevation and section, taken on line 8—8 of Figure 7;

Figure 9 is a section on line 9—9 of Figure 8;

Figure 10 is a section and elevation taken on line 10—10 of Figure 7, showing the angularly adjustable connection between the cap feed wheel hub and its driving gear;

Figure 11 is an elevation and cross-section with certain parts broken away, showing the ring separating and in-feed assembly, the adhesive applying mechanism and related parts;

Figure 12 is a section substantially along line 12—12 of Figure 11;

Figure 13 is a vertical section on an enlarged scale, showing one of the ring handling heads;

Figure 14 is a detailed view, showing a suction delivery passage which may be associated with the head of Figure 13;

Figure 15 is a section and plan view, taken on line 15—15 of Figure 11, showing the ring-supporting fingers or blades;

Figure 16 is a sectional view taken on a plane at right angles to the plane of Figure 12, at the lower end of the stack of rings, showing one of the heads in the act of picking off a ring from the lower end of the stack;

Figure 17 is a similar view showing the stack support and associated parts in the raised or inoperative position;

Figure 18 is a fragmentary elevation looking from the rear of Figure 17, substantially on line 17—17 of Figure 12;

Figure 19 is a fragmentary section taken substantially on line 19—19 of Figure 18;

Figure 20 is an elevation and partial section of a cap feeler mechanism;

Figure 21 is a fragmentary horizontal section of the ring supporting chute taken substantially on line 21—21 of Figure 17;

Figure 22 is a fragmentary elevation taken on a plane behind the ring inserting wheel, at the assembly and transfer zone;

Figure 23 is a section on line 23—23 of Figure 22, showing one of the heating and pressing assemblies in the cap receiving position;

Figure 24 is a similar view showing the relation of parts, after the cap has been received;

Figure 25 is an inverted horizontal section, taken on line 25—25 of Figure 23;

Figure 26 is a section and bottom plan view of the pressure applying head, taken on line 26—26 of Figure 24;

Figure 27 is a sectional view and elevation, taken on a plane behind that of Figure 22 and somewhat to the left thereof, substantially on line 27—27 of Figure 23;

Figure 28 is a plan view of the portion of the machine shown in section and elevation in Figure 27;

Figure 29 is a fragmentary section on line 29—29 of Figure 28;

Figure 30 is a fragmentary section of the receiving end of the discharge chute;

Figure 34 is a somewhat diagrammatic view of a portion of the inside surface of the main dial of the machine, laid out in planar form, with the ring inserting station shown at the left thereof;

Figure 34a is a continuation of Figure 34 at the left end of the latter, showing the cap transfer station and the cap in-feed station;

Figure 35 (Sheet 1) is a section on line 35—35 of Figure 1, showing one of the dial supporting rollers;

Figure 36 is a front elevation and partial section of a modified form of cap detector mechanism;

Figure 37 is a section on line 37—37 of Figure 36; and

Figure 38 is a view similar to Figure 19, showing the modified, mechanical mechanism for raising the ring stack supporting mechanism to the inoperative position in the absence of a cap in position to receive a ring.

Figure 31:
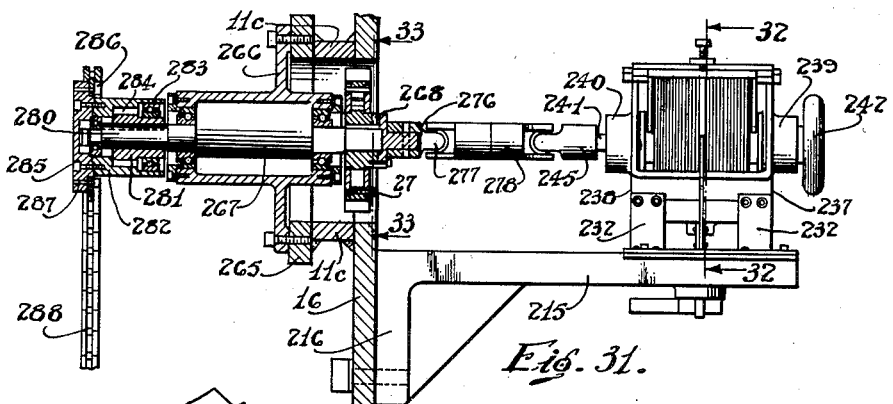
Figure 31 is a section and elevation of an adhesive applying mechanism and a preferred form of drive therefor.
Figure 32:
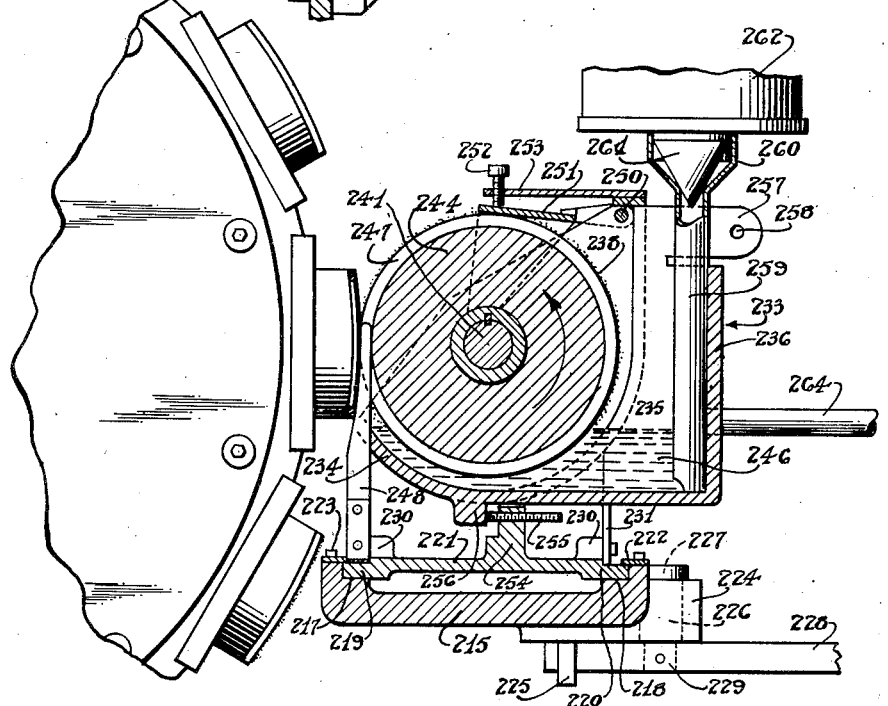
Figure 32 is a section on line 32—32 of Figure 31.

The embodiment of the invention shown in the accompanying drawings has been designed to assemble so-called slip rubber rings in continuous-thread, screw caps, but it must be understood that the invention is not limited to operation with caps of this type or to ring-like gaskets, since many features of the invention have wide application and may be used in connection with other types of caps and other types of gaskets, including overall liners, spot liners and rings of other materials.

The machine includes a main, stationary frame 10 made up of an annular back plate 11 and an annular front plate 12, both terminating in floor-engaging feet 13 and 14, the two plates being connected by a generally cylindrical rim made up of a plurality of arcuate sections 15a, 15b, 15c, and 15e, as shown in Figures 1, 2, and 2a.

The back plate 11 has welded to its radially inner edge, a forwardly projecting strip 11', which may be made up of a plurality of sections. Secured to the forward edge of the strip, as by welding, is a supplemental back plate 16 having a substantially semi-circular lower portion 16b and an arcuate, upwardly extending marginal portion 16c, defining a substantially semi-circular opening. Suitable reinforcing strips 16d and 16e may be welded to the rear face of the plate portion 16b and to the strip 11'.

The plate portion 16b is provided with a plurality of apertures, to the margins of which arcuate portions of the strip 11' are welded, as indicated at 11a, 11b, 11c, and 11d, to provide chambers projecting rearwardly from the supplemental back plate 16.

At four spaced points around the circumference of the rim 15, housings 18 are provided for roll shafts 19, the housings being made up of plates 18a and 18b, welded to the front and back plates 12 and 11 and to the arcuate plate 15a etc., and by suitable covers 18c.

Each roll shaft 19 (Figure 35, Sheet 1) may be secured by bolts 21 and washers 22 in appropriate openings in the front and rear plates 12 and 11. A roller 23 journalled by suitable ball bearings on each shaft engages and supports a circular rail 24, fixed upon the outer periphery of a main dial casting 25. The dial includes a substantially cylindrical, annular central web 26, front and rear radially inwardly extending flanges 27 and 28, and a radially outwardly extending flange 29, having its outer, circular edge 30 in close proximity to the inner circular edge 20 of the front plate 12. The rear flange 28 has a shouldered rear face to which is secured a large internal ring gear 31, in close proximity to the front surface of the rear plate 11, with the inner ends of the teeth shielded throughout most of the circumference of the gear by the forwardly projecting strip 16a, as best shown in Figures 2, 2a and 35. Thus, the main dial 25 and the ring gear 31 are supported by the four rollers 23, for rotation in a vertical plane about a horizontal axis.

On the outer surface of the main web 26, the dial 25 carries three annular rings 32, 33, and 34, insulated therefrom by a layer of suitable dielectric material 35 and each electrically connected to a plurality of suitable binding posts 36, 37, and 38 for purposes hereinafter described.

The inwardly projecting flanges 27 and 28 of the main dial support a plurality of axially elongated shallow channel members 40, having cap receiving bottoms 41, a leading edge flange 42 and a trailing edge flange 43, the latter being topped by a hardened metal strip 44 to make it project radially inwardly beyond the other flange. As indicated in Figures 34 and 34a, each cap receiving channel member 40 has a length in excess of three cap diameters, so that throughout at least a portion of the path of revolution of each member, three caps may be accommodated side by side, the caps being shifted lengthwise of the channels from the front, receiving end to the rear, delivery end.

The caps are delivered to the machine by a cap feed assembly indicated generally at 45 in Figure 1 and shown in detail in Figures 3–10. A cap feed wheel 46 is journalled by suitable bearings upon a shaft 47 carried by a hub 48, bolted to the rear face of the rear frame member 11. The wheel has a rearwardly extending hub 49, flanged outwardly at its rear end as at 50, where a ring gear 51 is secured by bolts 52. The gear is preferably composite and includes an annular, back-lash take up section 53, adjustably connected thereto by bolts 54. Gear 51 meshes with the large internal ring gear 31 and derives rotation therefrom. As indicated in Figure 10, bolts 52 extend through elongated openings 55 in the flange 50, so that the angular position of the gear relative to the cap feed wheel may be adjusted.

A plurality of pins 56 project radially from the circumference of the wheel 46, for movement in a path substantially tangential to the path of movement of the cap receiving channels secured to the main dial. A cap in-feed chute 57 delivers a line of caps in inverted position, with their tops down and their skirts projecting upwardly, to a bracket 58 having a lower arcuate surface 59 bolted to the outer face of a casting 60 (Fig. 4), carried by the plate portion 16 of the rear frame member 11. Adjacent its upper end, the bracket carries a pair of wing members 61, 62, pivoted at their upper ends upon posts 63, 64 and interconnected by a tension spring 65. The inwardly turned lower ends of the wings resist the downward movement of the liner caps under the influence of gravity, but are capable of swinging outwardly to permit a cap to pass, when one of the pins 56 on the circumference of the wheel 46 engages the inside of the outwardly facing skirt thereof.

Suitable lateral flanges or strips 66, 67 guide the caps in their movement along the arcuate section of the bracket, and spring pressed plates 68 may be provided to retard the downward movement of the caps as pulled along by the pins.

At the upper end, the cap chute is provided with an outer guard plate 70 supported in spaced relation above the undersurface of the chute by a plurality of collars 71, mounted on suitable bolts 72, the plate being cut away along its side edges to accommodate the inwardly bent ends of fingers 61 and 62. Below the guard plate 70 is a safety gate 73, fast on a pin 74 journalled in the flanges of the chute 58 and having a torsion spring 75 surrounding its outwardly projecting end, and urging the gate upwardly, movement in this direction being limited by a downwardly projecting lip 76, underlying the chute, as shown in Figure 5. Thus, in the event of a jam, gate 73 may swing downwardly against the force of spring 75.

It will be understood that, as the feed wheel 46 rotates, in timed relation and at the same peripheral speed as the named dial, caps are successively picked up by the pins, moved downwardly beyond the fingers 61 and 62, which swing outwardly to permit this movement, and are deposited successively in the cap receiving channels 40, at the front ends thereof, as indicated in Figure 7, the tops of the caps and the adjacent skirt portions being disposed between the ribs 42 and 43 thereof. The caps 100 are deposited in the position indicated at $a$ in Figure 34a. Adjacent the path of movement of the dial is a fixed guide member 80, having an angularly disposed entering face 81, and constituting the inwardly turned extension of a mounting plate 82, secured to the front face of the frame plate 12, as best shown in Figures 1 and 3. The guide shifts the cap inwardly from the position $a$ (Figure 34a) to the position $b$, and in which position the caps travel almost completely around the path of revolution of the dial, until the rings are inserted and the caps shifted to positions below the heating and pressing assemblies, as hereinafter described.

Projecting over the path of movement of the caps in the front ends of the channels 40 is an inwardly extending, arcuate guide plate 85, which may be made up of a plurality of sections, if desired, and which is supported by a plurality of brackets 86, secured to the front face of the main frame member 12. The guide plate maintains the caps in the channels, as they pass upwardly and around, during the revolution of the main dial, and until they are shifted rearwardly in the channels, to be engaged by the heating and pressing assemblies hereinafter described.

The slip rubber rings are separated from a stack, coated with adhesive and deposited in the caps by the mechanism indicated generally at 90 in Figure 1, and shown in detail in Figures 11–21 and 31–33. Referring first to Figures 11 and 12, a ring feed wheel casting 91 is journalled on suitable bearings on a stationary shaft 92, supported in a rearwardly extending hub 93, bolted to the rear face of the frame plate 16. The ring feed wheel includes a central hub 94 having a rear flange 95, to which a gear 96 is secured, in mesh with the large internal ring gear 31, rotatable with the main dial. The forward end of the ring feed wheel is outwardly flanged and laterally turned as at 97, to provide a peripheral rim having a plurality of circular openings 98 therein, surrounded by substantially square flat surfaces 99, upon which the ring handling heads 105 are mounted by means of suitable bolts.

Each ring head assembly comprises a centrally apertured, substantially square base plate 106 having an outwardly projecting cylindrical wall 107, in which is mounted a head 108 having an outer face provided with a plurality of parallel slots 109 and a central aperture 110. A downwardly projecting stem 111 is clamped in the central aperture in the plate 106, against a shoulder 112, by a bolt 113 extending through the reduced lower end of the aperture 110 as best shown in Figures 12 and 13. Thus, the base 106, the head 108 and the stem 111 are rigidly mounted upon the wheel.

Slidably mounted on the stem 111 is a depending sleeve 114 carrying at its upper, flanged end 115, a plate 116, supporting a circumferential series of vertically projecting pins 117, extending upwardly through bores 118.

As shown in Figure 14, adjacent each bore 118, a passage 119 may be formed, opening through the inner face of base plate 106 at its inner end and communicating at its outer end with the bore 118 by an oblique passage 120, the last mentioned passage being blocked by the pin 117 when in its outermost position, as hereinafter explained.

The sleeve 114 has a bifurcated lower end, between the legs 121 of which a cam following roller 122 is mounted, upon a suitable pin 123. A compression spring 124, disposed within an internal chamber in the sleeve 114 and abutting against a shoulder on the stem 111 constantly urges the sleeve 114 and the pin carrying plate downwardly, as shown at the top of Figure 12, and also in Figures 13 and 14. The several cam following rollers 122 are disposed in engagement with a cam 125, fast on the forward end of the ring feed wheel supporting shaft 92.

The front face of the wheel may be closed by a cover plate 126. A suction line 127 may be connected to the hollow interior of the shaft 92 and to the interior of the ring feed wheel, thereby continuously subjecting the interior to a partial vacuum, the line 127 being in communication at its other end with a suitable vacuum pump 128 as indicated in Figure 2a. Hence, when the pins 117 are in their lowered, full line position, as shown in Figure 14, suction may be communicated to the openings 118, through passages 120 and 119, to retain the rings 101 on their seats, as shown in Figure 13.

However, it has been found that this vacuum system for holding the rings on the head is unnecessary. As pointed out below, the heads may be made of such a diameter that the rings are stretched slightly when applied thereto, so that they do not tend to become dislodged; and suitable fixed guides may be employed to hold the rings on the heads, should they have any tendency to become separated therefrom.

When each ring carrying head reaches its position in alignment with, and actually disposed within, a cap on the dial, as shown at the bottom of Figure 12, the cam followers 122 (Figure 11) engage a rise 125a on cam 125 whereby the sleeves 114, plate 116 and pins 117 are projected outwardly, to block off the suction passage 120, if suction is used, and to project the rings into the associated caps. Since the rings have previously had adhesive applied to their outer surfaces, as hereinafter explained, they stick to the cap bottoms and leave the ring handling heads.

The mechanism for supporting the stack or column of rubber rings is shown most clearly in Figures 11, 12, 16 and 17. Referring to Figures 11 and 12, the back plate 16 of the main frame has bolted to its front face a rectangular frame 130, within which the rear flanged portion 131 of a bracket arm 132 is adjustably mounted, by a plurality of bolts 133, extending through the rectangular frame, the bracket being firmly held in adjusted position by bolts 134, extending through enlarged openings 135 in the back plate 16 and threaded into tapped holes in the rear portion 131. At its forward end, the bracket arm is connected integrally to an upright body portion 136, having a laterally extending flange 137, terminating at its lower end in an arcuate flange 138, overlying the path of movement of the ring handling heads. The upper portion of the body 136 has a head 140 provided with a bore in which an upright rod 141 is disposed. The rod is restrained against rotation by a pin 142 riding in a slot 143, communicating with the bore. The opposite face of the head 140 is bifurcated, to provide an upright way in which a slide 144 is mounted. At its lower end, the slide 144 is guided between forwardly projecting portions 145, integral with the lower end of the body 136 of the bracket. Suitable plates 146, 146' retain the slide 144 in the upper and lower ways.

Integrally attached to the slide 144 is a substantially semi-cylindrical stack supporting chute 147 (Figures 11 and 21) which may have a plurality of small spacer rods 148 welded to its inner surface for making line contact with the stack of rings. Projecting laterally from the slide bar 144 is a U-shaped strap 149, having a pair of downturned ends 150, supporting, at their lower ends, a slotted platform 151 (Figure 15) in the slots of which there are a plurality of laterally extending blade members 152, projecting under the stack of rings, toward the semi-cylindrical chute 147, and terminating in close proximity to the same, as shown in Figures 16 and 17.

When the stack support as a whole is in the lower, ring delivery position, as shown in Figure 16, the blades are disposed to enter the slots 109 in the upper face of each ring handling head, but when in the upper position, as shown in Figure 17, their arcuate lower edges clear the heads, so that the rings are supported above and out of contact with the heads.

Secured to the lower end of the slide bar 144 (Figure 17) is a laterally projecting block 155, overlying a cam sleeve 156, fast on a shaft 157, journalled in the lower end of the body 136 of the bracket. The cam sleeve has flats 158 and intermediate projections 159.

The rod 141 extends downwardly in the body of the bracket and its lower end (Figure 17) engages the upper surface of block 155. A compression spring 160 (Figure 11), surrounding the rod 141, bears against the upper surface of a handle 161, secured to the rod and urges the rod downwardly, thereby urging the block 151, the slide 144, and the ring stack supporting assembly in the same direction.

In the normal, lower position of the stack supporting chute and blades, as shown in Figure 16, the ring handling heads successively pick off the lowermost ring supported on blades 15, and the stack drops down, by gravity, as each ring is removed.

The lowermost ring is normally supported by the blades 152 with its upper surface slightly below the lower end edge of the chute 147. As each ring-receiving head moves around in the clockwise direction, Figures 11 and 16, the grooves 109 receive the blades 152 and each head projects upwardly a slight distance beyond the upper surfaces of the blades adjacent their free ends, as shown in Figures 12, 13, and 16. Hence, the leading end portion of each head 108, between the grooves 109 will engage the inner circumference of the lowermost ring and will drag the ring forwardly below the edge of chute 147 and below the arcuate guide plate 138. The heads 108 are of a diameter slightly in excess of the internal diameter of the rings, with the results that the rings will be stretched slightly and forced onto the seats provided by the marginal portion of each head and the outer end face of the cylindrical sleeve member 107. Hence, any possibility of the rings becoming dislodged from the heads is eliminated by this close fit and by the arcuate guide 138.

Means are provided for raising the column of stacks, to the inoperative position, as shown in Figure 17, if caps are not delivered to the main dial, in position to receive the rings.

Referring to Figures 1, 11, and 20, an arm 165, projecting forwardly from the back plate 16 has a bifurcated front end, in which a shaft 166 is journalled, having a laterally projecting portion surrounded by a torsion spring 167, connected to the shaft and arm respectively, tending to rotate the arm in a counterclockwise direction (Figure 20). The arm carries a depending cap feeler or detector 168, having a lower end 169 provided with inclined wings in the path of movement of the caps in the cap supporting channels 40. As long as the cap supports have caps therein, the detector 168 is maintained in its rearwardly disposed position, against the force of spring 166 as shown in full lines in Figure 20.

Should an empty cap holder move past the detector 168, however, the same swings forwardly, to the dotted line position, Figure 20, where it engages a roller 170 on the actuating arm of a limit switch 171 to control a solenoid circuit, as hereinafter explained. The swinging movement of the detector arm in this direction, may be limited by an adjustable stop 172, carried by the switch supporting bracket 173, adjustably secured to a plate 174 carried by the front frame member 12.

Referring to Figures 12 and 16–19, the flange 91 of the ring fed wheel is provided with a circumferential shoulder adjacent its periphery, upon which is mounted a toothed ring 175, having a plurality of teeth 176 projecting outwardly therefrom and provided with step leading faces 177 and inclined trailing faces 178. The ring is mounted for adjustment by cap screws 179, disposed in elongated, arcuate slots 180, formed in the inner flange of the ring. Each tooth 176 is disposed in advance of one ring handling head, and serves to lift the column before its head reaches the ring pick-up position, if the associated cap holder, which would normally receive that ring, is empty, as determined by the detector 168.

The cam actuating shaft 157 (Figures 17 and 19) has a splined connection with the cam 158, by means of a key 181, so that the shaft may have relative longitudinal movement with respect to the cam sleeve, and may also rotate the latter. At its forward end, the shaft is connected by a link 182 to a solenoid 183 (Figure 12) and at its other end is connected to a tension spring 184, having its opposite end connected to a bracket 185, secured to arm 132.

A collar 186, surrounding the rear, reduced end of the shaft 157 has a depending arm 187, normally disposed in alignment with the path of movement of the teeth 176, so that the teeth normally shift the arm to the raised position as shown in Figures 18 and 19, and as explained below. The sleeve 186 is rotatably mounted upon a hub 188 of a member keyed to the reduced end of the shaft 157 and having an outwardly projecting annular portion 189, shaped to provide a depending finger 190 and gear teeth 191 in mesh with an idler gear 192 journalled on a stud 193 carried by bracket 136. The gear 192 meshes with a second gear 194 similarly journalled on a stud 195. The second gear 194, in turn, meshes with gear 196 integral with and projecting outwardly from the sleeve 186.

Hence, when the parts are in the position shown in Figures 18 and 19, with the arm 187 in the raised position, the gear 194 will have been rotated counterclockwise, thereby rotating the idler gear 192 clockwise and the gear 191 counterclockwise, swinging the arm 190 downwardly and rotating the cam shaft 157 and the cam 158 counterclockwise, to bring the flat 158 into supporting relation to the block 155, to lower the stack support to the operative position.

In the event that a cap is absent from one of the cap supporting channels 40, the detector 168 swings toward the right (Figure 20) and opens the switch 171 thereby de-energizing the solenoid 183. Spring 184 then pulls the shaft 157 toward the left (Figures 12 and 19) bringing the lift arm 190 into the path of movement of the teeth 176, and moving the lowering arms 187 rearwardly behind the path of movement of the teeth. The first tooth 176 then engages the depending arm 190, swinging it and the sleeve 188 in a clockwise direction. This rotates the shaft 157 and cam 156, since they are keyed together, thereby bringing the rise 159 of the cam into supporting relation with the block 155, as shown in Figure 17, to lift the stack support to the inoperative position where the heads clear the innermost ring. During this movement of the arm 190, the gear 192 is rotated in a counterclockwise direction, rotating the gear 194 clockwise, with the result that the latter rotates the sleeve 186 counterclockwise, to lower the arm 187 into a position to be raised, subsequently, when the solenoid is again energized the arm 187 is shifted into the path of movement of the teeth 176.

A modified mechanism for controlling the delivery of rings to the ring transfer wheel, in accordance with the presence or absence of caps on the main dial, is shown in Figures 36–38, and in which a mechanical linkage system is substituted for the solenoid, the solenoid controlling switch and the electric circuit interconnecting the two.

The detector arm 168 may be the same as previously described, carried by a spring loaded shaft 166, mounted in a forwardly projecting, bifurcated arm 165a, forming the lower portion of a bracket 200, secured to the rear frame plate 16 and having an upper, forwardly projecting bifurcated arm 201, in which a second rock shaft 202 is journalled. The shaft 166 and 202 carry rearwardly projecting arms 203 and 204, respectively, interconnected by a link 205, extending through aligned apertures in their rear ends. A coil compression spring 206 surrounding the lower portion of link 205 is interposed between the upper face of arm 203 and a collar 207, fast on the rod.

The upper rock shaft 202 extends laterally behind the lower, arcuate end flange 138 of the ring stack supporting bracket and, on its free end carries a collar 208 having an arm 209 projecting upwardly therefrom, on the outer end of which is a fork 210, carrying inwardly projecting pins 211, disposed in a circumferential groove 212 in the end of the cam supporting shaft 157a, similar in general structure and function to the shaft 157, previously described. Thus, the yoke 210 controls the axial position of the shaft 157a which has the collars 188a and 186a mounted thereon, each having formed integrally therewith arms 190a and 187a, together with gear teeth, as previously described, meshing with idler gears 192a and 194a.

As shown in Figures 36–38, the parts are in the normal, operative position, and the ring stack support is lowered. If a cap is missing from the holder, the arm 168 swings to the right (Figure 37), drawing the rod 205 and the upper arm 204 downwardly and rotating the rock shaft 202 in a counterclockwise direction (Figures 37 and 38). This rotation swings the arm 209 and the yoke 210 rearwardly in Figure 36 and to the left in Figure 38, thereby drawing the shaft 157a to the left and bringing the lifter arm 190a into the path of movement of the teeth 176, so that the cam is shifted, as previously described, to raise the ring stack supporting platform and chute.

As shown in Figures 36 and 37, the supporting bracket 200 carries a solenoid 197, the armature of which is connected to a rod 198 mounted for vertical movement in apertured lugs 199. A forwardly projecting foot 213 has an aperture surrounding rod 205 and an end overlying the collar 207. When the solenoid is energized the parts are raised, as shown, but are urged downwardly against the pull of the solenoid by a tension spring 214, which is of greater strength than the compression spring 206 referred to above. Thus, when the solenoid 197 is de-energized, the arm 213 is drawn downwardly by the spring 214 and the rod 205 is also depressed, by compression of the spring 206 and by movement of the lower end of the rod 205 in the aperture in the arm 203. As a consequence, the ring feed chute and associated parts are raised, to prevent the delivery of rings to the ring carrying head, regardless of the presence or absence of caps in position to receive the rings. In other words, rings can be delivered to the heads only when the solenoid 197 is energized.

As mentioned previously, adhesive is applied to the outer surfaces of the rings carried by the ring handling heads, during their path of movement from the stack support to their position in registry with the caps, where the rings are deposited. The glue-applying assembly and the drive therefor are shown in Figures 1, 2, 2a, 11, and 31–33. A supporting bracket 215 (Figures 31 and 32) having a rear face 216 secured to the back main frame plate 16 projects forwardly into a position ahead of the ring transfer wheel 91, considered from the point of view of the direction of rotation of the main dial. The forward end of the bracket 215 is shaped to provide a pair of slideways 217 and 218, upon which the lateral edges 219 and 220 of a glue pot base member 221 are slidably mounted, the base being retained by overlying strips 222 and 223. The bracket 215 has a laterally projecting enlargement 224, bored to receive a depending stop pin 225 and the spindle 226 of a locking cam or eccentric 227, having a handle 228 pinned on the lower, reduced end 229 of the spindle. The locking cam 227 enters a cutaway portion in the adjacent, upstanding edge of the bracket 215 and engages the edge face of the portion 220 of base 221, to lock the same in adjusted position on the slideways.

The base 221 is shaped to provide a plurality of upstanding lugs 230, to which are secured flexible metal plates 231 and 232, bolted at their upper ends to appropriate flats formed on the surface of a glue pot 233 so that the pot may have limited relative lateral movement with respect to the base, by flexing of the supporting plates.

The glue pot includes a bottom having an upwardly projecting curved lip portion 234, projecting toward the ring transfer wheel and a rearwardly enlarged reservoir 235, defined by a rear wall 236, and side walls 237 and 238. The side walls have apertured bosses 239 and 240, in which bushings for a roll shaft 241 are disposed. The shaft carries, at its forward end, a hand wheel 242 and, at its rear end a coupling 243, connected to driving means hereinafter described. Intermediate its ends, the glue applying roll 244 is mounted, in position to dip into the glue 246 in the pot. The roll, which may be made of metal, rubber, or any suitable material, preferably has a centrally positioned, circumferential groove 247, in which the upper end of a finger 248 is received, the finger being supported at its lower end by suitable clips mounted on the base 221. The finger, riding in the circumferential slot prevents the rings on the heads from adhering to the roll and being picked off from the heads.

The glue roll 245 on both sides of the central, deep groove 247 is provided with a plurality of parallel, relatively shallow grooves which pick up glue during travel through the body 246 in the pot. Mounted upon a pin 250, carried by the side walls of the pot is a wiper blade 251 which wipes off the excess from the surface of the roll and leaves the grooves with an accurately predetermined amount of glue therein, for transfer to the rings. The wiper blade 251 is urged downwardly by a screw 252, carried by a plate 253, projecting forwardly toward the transfer dial from a rear portion of the glue pot.

The base 221 has one or more upstanding intermediate lugs 254, provided with a tapped bore in which a set screw 225 is threaded, with its front end in engagement with a depending lug 256 on the undersurface of the glue pot. Hence, the pot may be moved forwardly toward the ring transfer wheel to apply the desired pressure from the wheel to the rings on the ring handling heads, movement of the pot being permitted as noted above by flexing of the supporting plates 231.

The pot, adjacent its upper, rear end, is provided with a pair of rearwardly projecting, clamping arms or lugs 257, adapted to be drawn together by a clamping bolt 258, to engage a glue supply pipe 259, terminating at its lower end near the bottom of the pot and having a funnel-like upper end 260, constituting a seat for a valve 261, movable vertically in the lower end of a glue receptacle 262, under the control of an adjusting screw 263. Thus, the delivery of glue to the pot from the receptacle may be accurately controlled. An overflow pipe 254, near the bottom of the glue pot prevents the level of the glue therein from rising above the upper edge of the lip 234.

Figure 33:
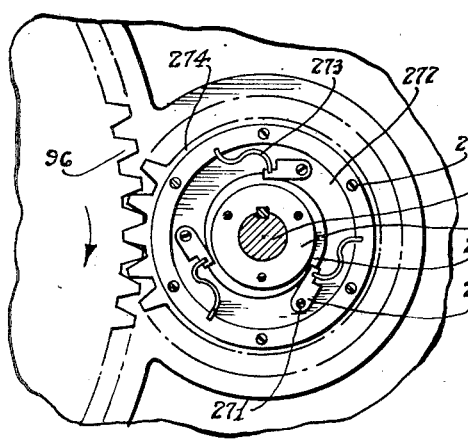
Figure 33 is a sectional view, on line 33—33 of Figure 31, showing a preferred form of overrunning clutch for driving the glue applying roller.

As shown in Figure 31, the frame strip 11c has welded to its rear face an arcuate mounting plate 265, to the rear face of which is bolted a bearing housing 266, in which a drive shaft 267 is journalled. On the forward end of the shaft 267, the hub 268 of an overrunning clutch is keyed, the hub having a plurality of ratchets 269 (Figure 33). A plurality of pawls 270, pivoted on pins 271 carried by parallel clutch face plates 272 are urged into contact with the ratchet, by springs 273, having their outer ends disposed in grooves cut in the inner face of a pinion 274, the pinion being secured to the face plates 272 by bolts 275.

Pinion 274 is in mesh with the gear 96 fast on the ring transfer wheel and which is rotated by the large internal ring gear 31 carried by the main dial. In the normal operation of the machine, rotation is imparted to the gear 274 by the main driving pinion, described below, so that the pawls 270, in engagement with the ratchets 269 rotate the shaft 267 in a counterclockwise direction (Figure 33).

The hub 268 of the overrunning clutch has, on its forward end, a shaft extension 276, connected, by a flexible coupling 277 and an intermediate sleeve 278 to the coupling member 243 on the roll shaft 241. Hence, rotation is imparted by the gear 274 to the glue roll 244, in a counterclockwise direction, Figure 32, at the same peripheral speed as the heads on the ring transfer wheel.

A highly desirable feature of the present invention is the provision of means for continuing the rotation of the glue roll in the pot, in the event that the machine is stopped for any reason, such as for repairs or adjustment. Upon the rear, left-hand, reduced end 280 of shaft 267 is keyed a hub 281 of a second overrunning clutch, including an outer sleeve 282, a ball bearing assembly 283 and an overrunning roller connection 284, the end of the sleeve being supported on the shaft by a ball bearing assembly 285. A sprocket wheel 286 is bolted to the inner face of a cap 287 for the clutch assembly. A chain 288 trained about the sprocket 286 derives rotation from a sprocket 289 (Figure 2a) associated with a speed reducer 290, driven by an electric motor 291, mounted upon the rear face of the main frame, in such manner that the shaft 267 (Figure 31) is driven in the normal direction, but at a slower rate. Hence, when rotation of the gear 274 is arrested, the shaft 241 continues to rotate relative thereto, as permitted by the first overrunning clutch (Figure 33) to rotate the roll and to prevent the adhesive from hardening on the surface thereof, or in the pot, or elsewhere.

Referring to Figures 11, 12, 13, 15, 16, 17, and 32, it will be noted that the outer face of each ring transfer head is disposed on a cylindrical surface, concentric with the axis of rotation of the ring transfer wheel and that the rings are held on the marginal portion thereof, bent to lie on a similar surface, being held down by the suction applied to their undersurfaces from the bores 118, if the vacuum system described above is used. In such a case, as the heads approach the glue applying roller 244 (Figure 11) the cam following rollers 122 drop down into a depression 125b on the surface of the cam 125, thereby withdrawing the pins 117 (Figure 14) inwardly, even more than is shown, to increase the suction pull on the rings on the heads, to eliminate any tendency of the rings to stick to the glue rolls, as they make tangential rolling contact with the surface of the roll. However, the blade 248 (Figure 32) has been found quite efficient in preventing dislodgement of the rings from the heads, and the use of suction has been eliminated in many cases. After the heads leave the glue applying position, the rollers may move outwardly onto the somewhat raised surface of the cam, as indicated at 125c, until the rise 125a is encountered, at which point the suction is cut off (if used at all) and the pins 117 are projected outwardly, to deposit the rings in the caps, as explained above.

Substantially midway in its axial length, the main dial 25 supports a circumferential series of heat and pressure applying assemblies 300, which receive the assembled caps and rings, to dry the adhesive while the rings are subjected to substantial pressure.

Referring to Figures 22-26, each pressing assembly comprises a base casting 301 straddling the associated cap receiving channel member 40 and having spaced apart, depending legs 302 and 304 secured to the upstanding flanges 42 and 43 thereof. Upon each base member 301 there is mounted an upstanding cylindrical housing 305, having a central bore, in which a sleeve 306 is mounted for limited longitudinal movement. Upon the lower, reduced end of the sleeve 306 there is mounted, by means of a screw 307, a presser head 308, with a spacer sleeve 309 interposed between its upper surface and a shoulder 310 on the sleeve 306. The spacer sleeve 309 has a pair of outwardly projecting trunnions 311 and 312 adjacent its upper end, upon which cam following rollers 313 and 314 are journalled.

The cylindrical housing 305 is closed at its upper end by a cap 315, having a depending guide boss 316, in which a threaded pin 317 is disposed. A compression spring 318 is interposed between the lower surface of the boss 316 and the upper surface of the screw 307, in encircling relation to the lower end of pin 317 and a similar pin 319 carried by the screw 307.

The lower face of the head 308 has a downwardly projecting annular rib 320 shaped to register with the ring gaskets in the caps, to apply pressure thereto.

It will be understood that the compression spring 318 urges the sleeves 306 and 309 and the head 308 downwardly. The head and the sleeves are raised by engagement of the rearwardly projecting cam following roller 314 with a fixed cam 321 as shown in Figure 23. The other roller 313, disposed in the vertical slot 322 in the housing 305 acts as a guide roller and, in cooperation with the roller 314, disposed in slot 323, prevents rotation of the sleeve and resists turning forces applied thereto by impact of the cam following roll with the end 324 of cam 321. Referring to Figures 1 and 12, the cam 321 is supported by a bracket 325, having an upwardly projecting flange 326 secured to the main back plate 16. The cam is positioned with its forward end 324 (Figure 22), ahead of the ring transfer wheel, so that as the pressing assemblies move adjacent and beyond the point of insertion of the ring into the caps, the heads are raised as shown in Figure 23.

At a point just beyond the ring transfer wheel, there is an upstanding bracket 327 (Figure 11), carried by the front frame member 12, carrying at its upper end a cap transfer plate 328 (Figure 23) in adjustable relation, by means of cap screws 330, disposed in elongated slots 331. As shown in Figure 28, the plate 328 has an angularly disposed inner edge 332, arranged to engage the beaded edge of each cap, to shift the same inwardly in its cap supporting channel, into a position directly beneath the associated pressure applying assembly. The transfer plate is preferably overlaid by an upper, hold-down plate 329. After the assemblies and the caps depart from the position of the plates 328 and 329 the cam following rollers ride down the inclined end 334 of the cam 321, whereupon the heads 308 enter the caps and apply pressure to the rings.

As most clearly shown in Figures 7, 12, 23, and 24, heat is applied by means of electrical heating elements 335 to dry or otherwise set the adhesive between the rings and the inner surfaces of the closures, while subject to the pressure of the heads 308. The elements 335 are secured to the undersurfaces of the cap supporting channel members 40, directly below the positions of the pressure applying assemblies. Each heating unit has a pair of electrical binding posts 336 and 337, connected by wires 338 and 339 to one pair of the binding posts 37 and 38 or 37 and 36, in electrical connection with the rings 32, 33, and 34. Preferably a three-wire system is used, with certain of the heating elements connected to the center wire, represented by rail 33 and one side rail 34, and the others connected to the center rail 33 and the other side rail 32. Thus, the heating units 335 transfer heat to the caps and the adhesive coating through the bottoms of the cap receiving channels 40, to set the adhesive during the travel of the caps around the path of movement of the dial through substantially 360°.

Current is delivered to the rails 32, 33, and 34 by the brush mechanism shown in Figures 7, 8, and 9, comprising a block of insulating material 340 secured by a plurality of cap screws 341 to angle clips 342 mounted on the inner surfaces of housing plates 343 and 344, forming a part of the main, stationary annular frame. The insulating block 340 carries three binding posts 345, 346, 347, to which the three wires (not shown) leading from a suitable source of current may be connected. Brushes 348, 349 and 350 are connected by wires 360 to the respective binding posts. The brushes are forced inwardly into contact with the three rails by spring pressed arms 361, 362, and 363, pivoted on stub shafts 364, 365, and 366, and having associated therewith coil torsion springs 367. Thus, current is delivered to the rails and from the rails to the several heating elements.

The caps with the rings in place are subjected to heat and pressure by the pressing units 300 and the electric heater 335 during their travel with the main dial, throughout substantially a complete revolution of the latter, from a point adjacent the rear end 334 of cam 321 (Figure 27), to a point adjacent the leading end of the cam, where the spring pressed plungers or heads 308 are withdrawn from the caps. As soon as the heads are so withdrawn, the caps engage a stationary cam 370 (Figure 28), having an inwardly inclined edge so that the caps are shifted rearwardly in the cap carrying channel members 40. A pair of permanent magnets 371, carried by a support 372, bolted to the back plate 16 draw the caps rearwardly. As the dial and the channels continue their movement, the caps come opposite a plurality of additional permanent magnets 373 so they are drawn still further in a rearward direction in the channels. This movement may be assisted by the incoming caps, moved rearwardly by the edge 332 of cam 328, when being shifted into position below the pressing assemblies. The caps pass below a guide plate 374, carried by the back plate 16, which extends along an arcuate path, concentric with the main dial upwardly beyond the vertical radial plane of the machine and downwardly therebeyond where it joins a discharge chute 375 (Figures 1 and 30). The chute is curved radially inwardly and then rearwardly, and extends through the semi-circular opening in the back plate 16. As shown in Figure 30, the chute includes a bottom plate 376 and is closed at the sides, so that the caps slide therealong by gravity and are discharged from the lower, rear end thereof. The caps may be delivered to appropriate receptacles or to a delivery conveyor, as is well understood in the art.

As shown in Figures 2 and 2a, a main driving motor 380, secured to the back frame member 11 is connected through a speed reducer 381 to a main drive shaft 382, having a spur gear 383 on its forward end, in mesh with the large ring gear 31 carried by the main dial. Hence, the main dial is rotated, and the gears 51, 96, and 274, connected, respectively, to the cap infeed dial, the ring feed dial and the glue-spreading roll, are driven thereby.

It is thought that the operation of the apparatus of the present invention will be apparent to one skilled in the art, from a consideration of the foregoing description. Caps are fed to the infeed chute 57 from any suitable source of supply, by means well understood in the art. The caps are arrested by the pivoted arms 61 and 62 and are picked off, one by one, by the pins 56 associated with the cap infeed dial 46. The caps are delivered, one by one, to the cap receiving channels and travel around with the main dial, being held in the channels by the arcuate guide plate 85. The caps move past the cap feeler 168, which renders the ring delivery mechanism inoperative, if one or more caps are absent from the cap support or supports which would normally receive rings from the ring feed mechanism. If caps are present, they receive adhesively coated rubber rings from the heads 108, associated with the ring infeed dial 91. The heads, as previously described, pick off rings from the bottom of the stack, move them past the glue spreader roll 244 and deposit them in the caps, by outward projection of the pins 117. Substantially immediately after the heads are withdrawn from the caps, by rotation of the ring feed dial, the caps and rings are shifted rearwardly in the cap supporting channels by the stationary cam 328, into positions below the pressing heads 308. The heads descend, as the cam following rollers 314 ride down the end 334 of cam 321 and heat and pressure are applied to the caps, throughout substantially a complete rotation of the main dial. The caps with the rings secured therein are then shifted rearwardly by the combined actions of the cam 370, magnets 371 and 373 and the push of the incoming caps. The caps move under the guide plate 374 and are discharged through the chute 375.

Although the invention has been described with considerable particularity in the foregoing specification and by reference to the accompanying drawings, it must be understood that the invention is not limited to the details of construction shown and described, but includes all modifications coming within the scope of the appended claims and their equivalents.

We claim:

1. An apparatus for assembling seals in receptacle closures, comprising an annular main dial mounted for rotation on a substantially horizontal axis and having an inwardly facing annular surface, a plurality of closure receiving seats on said surface, means for delivering a line of closures to the seats for travel therewith along an arcuate path, means for delivering seals to the closures on said seats, means for shifting the closures and seals axially of the dial for travel along an arcuate path parallel to the first path, and means for applying heat and pressure to the seals and closures as they travel along the last mentioned path.

2. An apparatus for assembling seals in receptacle closures, comprising an annular main dial mounted for rotation on a substantially horizontal axis and having an inwardly facing annular surface, a plurality of closure receiving seats on said surface, means for delivering a line of closures to the seats for travel therewith along an arcuate path, means for delivering seals to the closures on said seats, means for applying adhesive to the seals before their delivery to the closures, means for shifting the closures and seals axially of the dial for travel along an arcuate path parallel to the first path, and means for applying heat and pressure to the seals and closures as they travel along the last mentioned path.

3. An apparatus for assembling seals in receptacle closures, comprising an annular main dial mounted for rotation on a substantially horizontal axis and having an inwardly facing annular surface, a plurality of closure receiving seats on said surface, means for delivering a line of closures to the seats for travel therewith along an arcuate path, means for delivering seals to the closures on said seats, means for applying adhesive to the seals before their delivery to the closures, means for shifting the closures and seals axially of the dial for travel along an arcuate path parallel to the first path, means for applying heat and pressure to the seals and closures as they travel along the last mentioned path, means for relieving the pressure applied by the last mentioned means, means for shifting the closures and seals axially of the dial for travel along a third arcuate path parallel to the first mentioned paths, and means for discharging the closures and seals from the dial after travel along said path.

4. An apparatus for assembling seals in receptacle closures, comprising an annular main dial mounted for rotation on a substantially horizontal axis and having an inwardly facing annular surface, a plurality of closure receiving seats on said surface, means for delivering a line of closures to the seats for travel therewith along an arcuate path, means for holding a stack of seals, means for picking off the seals, one by one, from the stack and for depositing the same in the closures on said seats, means for shifting the closures and seals axially of the dial for travel along an arcuate path parallel to the first path, and means for applying heat and pressure to the seals and closures as they travel along the last mentioned path.

5. An apparatus for assembling seals in receptacle closures, comprising an annular main dial mounted for rotation on a substantially horizontal axis and having an inwardly facing annular surface, a plurality of closure receiving seats on said surface, means for delivering a line of closures to the seats for travel therewith along an arcuate path, means for holding a stack of seals, means for picking off the seals, one by one, from the stack and for depositing the same in the closures on said seats, means for applying adhesive to the seals prior to depositing them in the closures, means for shifting the closures and seals axially of the dial for travel along an arcuate path parallel to the first path, and means for applying heat and pressure to the seals and closures as they travel along the last mentioned path.

6. An apparatus for assembling ring gaskets in receptacle closures comprising an upright stationary annular frame, an annular dial mounted for rotation on a horizontal axis in said frame, a plurality of inwardly facing closure receiving seats carried by the inner surface of said dial, means for delivering a line of closures, one by one, to the seats for travel therewith along an arcuate path, means for delivering ring gaskets to the closures on said seats, means for shifting the closures and gaskets axially in said seats for travel along a path parallel to the first path, and means for subjecting the gaskets and closures to heat and pressure as they travel along the last mentioned path, to unite the gaskets to the closures.

7. An apparatus for assembling ring gaskets in receptacle closures comprising an upright stationary annular frame, an annular dial mounted for rotation on a horizontal axis in said frame, a plurality of inwardly facing closure receiving seats carried by the inner surface of said dial, a supplemental dial mounted for rotation interiorly of the first dial for delivering a line of closures, one by one, to the seats for travel therewith along an arcuate path, means for delivering ring gaskets to the closures on said seats, means for shifting the closures and gaskets axially in said seats for travel along a path parallel to the first path, and means for subjecting the gaskets and closures to heat and pressure as they travel along the last mentioned path, to unite the gaskets to the closures.

8. An apparatus for assembling ring gaskets in receptacle closures comprising an upright stationary annular frame, an annular dial mounted for rotation on a horizontal axis in said frame, a plurality of inwardly facing closure receiving seats carried by the inner surface of said dial, a supplemental dial mounted for rotation interiorly of the first dial for delivering a line of closures, one by one, to the seats for travel therewith along an arcuate path, a second supplemental dial mounted within the first dial for delivering ring gaskets to the closures on said seats, means for shifting the closures and gaskets axially in said seats for travel along a path parallel to the first path, and means for subjecting the gaskets and closures to heat and pressure as they travel along the first mentioned path, to unite the gaskets to the closures.

9. An apparatus for assembling ring gaskets in receptacle closures comprising an upright stationary annular frame, an annular dial mounted for rotation on a horizontal axis in said frame, a plurality of inwardly facing closure receiving seats carried by the inner surface of said dial, a supplemental dial mounted for rotation interiorly of the first dial for delivering a line of closures, one by one, to the seats for travel therewith along an arcuate path, a second supplemental dial mounted for rotation on a horizontal axis interiorly of the first mentioned dial, the last mentioned dial having a plurality of circular heads projecting radially therefrom and arranged to enter the closures by tangential movement, means for delivering ring gaskets to said heads for travel therewith, means for discharging the gaskets from the heads and for depositing them in the closures, means for shifting the closures and gaskets axially in said seats for travel along a path parallel to the first path, and means for subjecting the gaskets and closures to heat and pressure as they travel along the last mentioned path, to unite the gaskets to the closures.

10. An apparatus for assembling ring gaskets in receptacle closures comprising an upright stationary annular frame, an annular dial mounted for rotation on a horizontal axis in said frame, a plurality of inwardly facing closure receiving seats carried by the inner surface of said dial, a supplemental dial mounted for rotation interiorly of the first dial for delivering a line of closures, one by one, to the seats for travel therewith along an arcuate path, a second supplemental dial mounted for rotation on a horizontal axis interiorly of the first mentioned dial, the last mentioned dial having a plurality of circular heads projecting radially therefrom and arranged to enter the closures by tangential movement, means for delivering ring gaskets to said heads for travel therewith, means for applying adhesive to the gaskets on the heads, means for discharging the gaskets from the heads and for depositing them in the closures, means for shifting the closures and gaskets axially in said seats for travel along a path parallel to the first path, and means for subjecting the gaskets and closures to heat and pressure as they travel along the last mentioned path, to unite the gaskets to the closures.

11. An apparatus for assembling ring gaskets in receptacle closures comprising an upright stationary annular frame, an annular dial mounted for rotation on a horizontal axis in said frame, a plurality of inwardly facing closure receiving seats carried by the inner surface of said dial, a gravity chute for a line of closures including resilient means for arresting the lowermost closure in the line, a closure infeed dial mounted interiorly of the main dial having closure engaging means on its circumference positioned to pick off the lowermost closures from the chute, one by one, and to deliver the same by tangential movement to said seats for travel with the latter along an arcuate path, means for shifting the closures and gaskets axially in said seats for travel along a path parallel to the first path, and means for subjecting the gaskets and closures to heat and pressure as they travel along the last mentioned path, to unite the gaskets to the closures.

12. An apparatus for assembling ring gaskets in receptacle closures, comprising means for conveying the closures along a predetermined path with their interiors exposed, means for holding a stack of rings, including a blade-like bottom support and a member engaging the sides of the rings with its lower edge spaced above the support a distance substantially equal to the thickness of each ring, a transfer dial below said stack having a plurality of substantially circular, slotted heads positioned to embrace and project above said blade-like support, to enter the interior of the lowermost ring and to draw the same below said edge, said heads being movable on a path to transport the rings to a closure on said conveying means by relative tangential movement, and means for discharging the rings from said heads and for depositing the same in the closures, a closure feeler associated with said conveying means for detecting the absence of a closure in proper position on said path, and means actuated by said feeler for lifting the cap support clear of the head which would normally deliver a ring to a closure at that point on said path, in the absence of such a closure at that position.

13. An apparatus for assembling ring gaskets in receptacle closures, comprising means for conveying the closures along a predetermined path with their interiors exposed, means for holding a stack of rings, including a blade-like bottom support and a member engaging the sides of the rings with its lower edge spaced above the support a distance substantially equal to the thickness of each ring, a transfer dial below said stack having a plurality of substantially circular, slotted heads positioned to embrace and project above said blade-like support, to enter the interior of the lowermost ring and to draw the same below said edge, said heads being movable on a path to transport the rings to a closure on said conveying means by relative tangential movement, means for discharging the rings from said heads and for depositing the same in the closures and means for applying adhesive to the rings while on said heads prior to their deposit in the closures, a closure feeler associated with said conveying means for detecting the absence of a closure in proper position on said path, and means actuated by said feeler for lifting the cap support clear of the head which would normally deliver a ring to a closure at that point on said path, in the absence of such a closure at that position.

14. An apparatus for assembling ring gaskets in receptacle closures comprising a stationary frame having a plurality of rollers journalled on horizontal axes, an annular dial peripherally supported for rotation on said rollers, means on the inner surface of the dial for supporting a line of caps for movement with the dial along a substantially circular path, a circular, inwardly facing ring gear carried by the dial, a closure infeed dial mounted for rotation interiorly of the annular dial on a path substantially tangential to the inner surface thereof, a gear fixed to the infeed dial in mesh with the ring gear and receiving rotation therefrom to rotate the infeed dial at substantially the same surface speed as the annular dial, a ring gasket transfer dial mounted for rotation interiorly of the annular dial on a path substantially tangential to the inner surface thereof, a gear fixed to the transfer dial in mesh with the ring gear and receiving rotation therefrom to rotate the transfer dial at substantially the same surface speed as the annular dial.

15. An apparatus for assembling ring gaskets in receptacle closures comprising a stationary frame having a plurality of rollers journalled on horizontal axes, an annular dial peripherally supported for rotation on said rollers, means on the inner surface of the dial for supporting a line of caps for movement with the dial along a substantially circular path, a circular, inwardly facing ring gear carried by the dial, a driving pinion journalled on the frame in mesh with said ring gear for rotating the dial, a closure infeed dial mounted for rotation interiorly of the annular dial on a path substantially tangential to the inner surface thereof, a gear fixed to the infeed dial in mesh with the ring gear and receiving rotation therefrom to rotate the infeed dial at substantially the same surface speed as the annular dial, a ring gasket transfer dial mounted for rotation interiorly of the annular dial on a path substantially tangential to the inner surface thereof, a gear fixed to the transfer dial in mesh with the ring gear and receiving rotation therefrom to rotate the transfer dial at substantially the same surface speed as the annular dial.

16. An apparatus for assembling ring gaskets in receptacle closures comprising a stationary frame having a plurality of rollers journalled on horizontal axes, an annular dial peripherally supported for rotation on said rollers, means on the inner surface of the dial for supporting a line of caps for movement with the dial along a substantially circular path, a circular, inwardly facing ring gear carried by the dial, a driving pinion journalled on the frame in mesh with said ring gear for rotating the dial, a closure infeed dial mounted for rotation interiorly of the annular dial on a path substantially tangential to the inner surface thereof, a gear fixed to the infeed dial in mesh with the ring gear and receiving rotation therefrom to rotate the infeed dial at substantially the same surface speed as the annular dial, a ring gasket transfer dial mounted for rotation interiorly of the annular dial on a path substantially tangential to the inner surface thereof, a gear fixed to the transfer dial in mesh with the ring gear and receiving rotation therefrom to rotate the transfer dial at substantially the same surface speed as the annular dial, an adhesive applicator roll adjacent the transfer dial and a gear fixed with respect to the roll in mesh with the transfer dial gear to rotate the roll at the same surface speed as the transfer dial.

17. In an apparatus for assembling ring gaskets in receptacle closures, a main assembly dial, a ring transfer dial for depositing rings in closures on the main dial, an adhesive applicator roll for applying adhesive to the rings on the transfer dial prior to their deposition in the caps, means for positively driving the main dial and the transfer dial, a gear driven by one of said dials, a one-way clutch between said gear and the roll to drive the latter when the machine is operating, and independent means for rotating the roll when the machine is stopped, the last mentioned rotation being permitted by overrunning of the one-way clutch.

18. An apparatus for assembling ring gaskets in receptacle closures comprising an annular main dial supported for rotation on a horizontal axis, a plurality of axially elongated, inwardly facing closure receiving seats carried by the inner surface of said dial, a closure infeed dial mounted for rotation interiorly of the first dial, in substantially tangential relation to the forward ends of said closure receiving seats for delivering a line of closures one by one to said seats adjacent their forward ends, a ring gasket infeed dial mounted for rotation interiorly of the first dial in substantially tangential relation to the closure receiving seats, means for aligning the closures in their path of travel adjacent the forward ends of the seats with said ring infeed dial, for the reception of rings therefrom, a plurality of heat and pressure applying assemblies associated with said seats spaced behind their forward ends, and means for shifting the closures and rings rearwardly into operative relative to said assemblies.

19. A mechanism for delivering ring gaskets to receptacle caps moving in a line in spaced relation along a predetermined path, comprising a dial having a plurality of radially projecting heads mounted for revolution on a path substantially tangential to the path of cap movement, means for supporting a stack of ring gaskets with the lowermost ring partially intersecting the path of movement of the leading portions of said heads, to receive said portion therein and to be dragged from the bottom of the stack thereby, and means for discharging the rings from the heads on the tangential portion of said paths to deposit the rings in the caps.

20. A mechanism for delivering ring gaskets to receptacle caps moving in a line in spaced relation along a predetermined path, comprising a dial having a plurality of radially projecting heads mounted for revolution on a path substantially tangential to the path of cap movement, means for supporting a stack of rings with the inner edge of the leading portion of the lowermost ring intersecting a portion of the path of the heads, whereby the rings are picked off from the bottom of the stack by the heads successively, and means for discharging the rings from the heads on the tangential portion of said paths to deposit the rings in the caps.

21. A mechanism for delivering ring gaskets to receptacle caps moving in a line in spaced relation along a predetermined path, comprising a dial having a plurality of radially projecting heads mounted for revolution on a path substantially tangential to the path of cap movement, means for supporting a stack of rings with the inner edge of the leading portion of the lowermost ring intersecting a portion of the path of the heads, whereby the rings are picked off from the bottom of the stack by the heads successively, and means for discharging the rings from the heads on the tangential portion of said paths to deposit the rings in the caps, the last mentioned means comprising a plurality of pins carried by the heads underlying the rings thereon, and cam following means rotatable with the dial for projecting the pins outwardly to dislodge the rings from the heads.

22. A mechanism for delivering ring gaskets to receptacle caps moving in a line in spaced relation along a predetermined path, comprising a dial having a plurality of radially projecting heads mounted for revolution on a path substantially tangential to the path of cap movement, each of said heads having a cylindrical outer surface concentric with the dial axis, a circular seat around and stepped inwardly from the margin of said surface, and a plurality of pins mounted to be projected outwardly relative to said seat, means for supporting a stack of ring gaskets with the lowermost ring partially intersecting the path of movement of the leading portions of said outer surfaces of the heads, to receive said portions therein and to be dragged from the bottom of the stack thereby for movement with the head on said seat, and means for projecting the pins outwardly as the heads move on the tangential portion of said paths to dislodge the rings from the seats and to deposit them in the caps.

23. A mechanism for delivering ring gaskets to receptacle caps moving in a line in spaced relation along a predetermined path, comprising a dial having a plurality of radially projecting heads mounted for revolution on a path substantially tangential to the path of cap movement, each of said heads having a plurality of grooves in its outer surface parallel to its path of movement, means for holding a stack of rings including a plurality of parallel supporting blades and a member engaging the side of the stack having its lower edge spaced above the blades a distance substantially equal to the thickness of a single ring, said stack holding means being so positioned relative to the path of movement of the heads that the latter receive the blades in the slots as they move therepast and engage the lowermost ring and draw the same from the stack for transportation to and deposit in the caps.

24. A mechanism for delivering ring gaskets to receptacle caps moving in a line in spaced relation along a predetermined path, comprising a dial having a plurality of radially projecting heads mounted for revolution on a path substantially tangential to the path of cap movement, each of said heads having a plurality of grooves in its outer surface parallel to its path of movement, means for holding a stack of rings including a plurality of parallel supporting blades and a member engaging the side of the stack having its lower edge spaced above the blades a distance substantially equal to the thickness of a single ring, said stack holding means being so positioned relative to the path of movement of the heads that the latter receive the blades in the slots as they move therepast and engage the lowermost ring and draw the same from the stack for transportation to and deposit in the caps, and means for raising the stack holding means to lift the lowermost ring clear of the path of movement of the heads.

25. A mechanism for delivering ring gaskets to receptacle caps moving in a line in spaced relation along a predetermined path, comprising a dial having a plurality of radially projecting heads mounted for revolution on a path substantially tangential to the path of cap movement, each of said heads having a plurality of grooves in its outer surface parallel to its path of movement, means for holding a stack of rings including a plurality of parallel supporting blades and a member engaging the side of the stack having its lower edge spaced above the blades a distance substantially equal to the thickness of a single ring, said stack holding means being so positioned relative to the path of movement of the heads that the latter receive the blades in the slots as they move therepast and engage the lowermost ring and draw the same from the stack for transportation to and deposit in the caps, and means controlled by the absence of a cap in said line in the position normally to receive a ring from the head immediately approaching the stack holding means, for raising the stack holding means to lift the lowermost ring clear of the path of movement of the head, to prevent the withdrawal of a ring by said head.

26. A mechanism for delivering ring gaskets to receptacle caps moving in a line in spaced relation along a predetermined path, comprising a dial having a plurality of radially projecting heads mounted for revolution on a path substantially tangential to the path of cap movement, each of said heads having an outer surface and a marginal, inwardly stepped seat disposed on cylindrical surfaces concentric with the dial axis, the seat being spaced inwardly from the outer surface a distance less than the thickness of a ring, means for delivering rings to the seats, and an adhesive applicator adjacent the path of movement of the heads, spaced slightly from the outer surface thereof and positioned to apply adhesive to the surfaces of the rings on the seats projecting outwardly beyond the heads, and means for discharging the rings from the heads and for depositing the same in the caps.

27. A mechanism for delivering ring gaskets to receptacle caps moving in a line in spaced relation along a predetermined path, comprising a dial having a plurality of radially projecting heads mounted for revolution on a path substantially tangential to the path of cap movement, each of said heads having an outer surface and a marginal, inwardly stepped seat disposed on cylindrical surfaces concentric with the dial axis, the seat being spaced inwardly from the outer surface a distance less than the thickness of a ring, means for delivering rings to the seats, and an adhesive applicator roll positioned adjacent the path of movement of the heads to make rolling contact with the surfaces of the rings projecting outwardly beyond the outer surfaces of the heads and disposed out of contact with the head surfaces.

28. A mechanism in accordance with claim 27 characterized in that the glue applicator roll is peripherally grooved and in that a stationary blade projects into the groove between the outer surfaces of the heads and the roll on the departing side of the line of contact between the roll and the rings to hold the rings on the seats and to prevent them from adhering to the roll.

29. In an apparatus for assembling sealing rings in receptacle caps, a plurality of cap receiving channels mounted for movement along a predetermined path, said channels being transversely elongated relative to their line of movement, means for delivering caps to one end of each channel, means for delivering a ring to each cap at said end of each channel, and means for subjecting the caps and rings to heat and pressure to unite the two, the last mentioned means comprising a plunger supporting sleeve disposed above each channel behind the receiving end thereof, a downwardly spring pressed plunger in said sleeve, cam means for raising the plunger against the force of the spring and for controlling its descent, means for shifting the closures and the rings rearwardly from said end of the channels to a position below the sleeve for the reception of the plunger upon descent thereof, means for shifting the caps in the direction of the other end of the channels upon raising of the plungers, and means below the channels in alignment with the plunger for applying heat to the channels and to the caps and rings.

30. An apparatus in accordance with claim 29 in which said sleeves are supported by means straddling the channel members, open at opposite ends to permit the shifting of the caps in one direction to and from a position therebelow.

31. In an apparatus for assembling sealing rings in receptacle caps, a plurality of cap receiving channels mounted for movement along a predetermined path, said channels being transversely elongated relative to their line of movement, means for delivering caps to one end of each channel, means for delivering a ring to each cap at said end of each channel, means positioned substantially mid-way along the length of each channel for subjecting the caps and rings to heat and pressure to unite the two, stationary cam means for shifting the caps and rings from the first mentioned ends of the channels into operative relation to said heat and pressure applying means, means for shifting the caps from the last mentioned positions to a position adjacent the other ends of the channel, the last mentioned means comprising a plurality of magnets fixed with respect to the path of movement of the channels for drawing the caps in said direction, and fixed cam means for removing the caps from the channels through the last mentioned ends thereof.

32. An apparatus for assembling ring gaskets in receptacle closures, means for conveying a plurality of caps in a line, a ring transfer dial rotatable adjacent the line to deliver rings to the caps, a ring stack holder adjacent the dial, movable from a normal position where the dial takes rings from the stacks to an inoperative position where rings cannot be taken, a cap feeler adjacent said line to detect the absence of a cap in proper position therein, means for moving said holder from each of said positions to the other, actuating means for said moving means rotatable with the dial, means for shifting a part associated with said holder-moving means into the path of movement of said actuating means to move the holder to the inoperative position for shifting another part associated with the holder-moving means into the path of movement of said actuating means to move the holder to the normal position, and means controlled by said feeler for actuating said shifting means.

33. An apparatus for assembling ring gaskets in receptacle closures, means for conveying a plurality of caps in a line, a ring transfer dial rotatable adjacent the line to deliver rings to the caps, a ring stack holder adjacent the dial, movable from a normal position where the dial takes rings from the stack to an inoperative position where rings cannot be taken, a cap feeler adjacent said line to detect the absence of a cap in proper position therein, a cam support for the holder rotatable to move said holder from each of said positions to the other, a plurality of abutments rotatable with said dial, means establishing connection between said cam support and said abutments, said means being shiftable to move the cam and the holder to each of said positions, and means controlled by said feeler for shifting the last mentioned means.

34. Apparatus in accordance with claim 33, in which the shifting means comprises a solenoid and a spring, and in which the feeler-controlled means comprises a switch in the solenoid circuit.

35. Apparatus in accordance with claim 33 in which the shifting means comprises a spring pressed lever and in which the feeler controlled means comprises a linkage system connected between the feeler and said lever.

EIBE A. WILCKENS.
CHARLES C. STOLL.

References Cited in the file of this patent

UNITED STATES PATENTS

| Number | Name | Date |
|---|---|---|
| 1,098,087 | Bogdanffy | May 26, 1914 |
| 1,236,019 | Tzibides | Aug. 7, 1917 |
| 1,401,300 | Alberti et al. | Dec. 27, 1921 |
| 1,574,913 | McManus | Mar. 2, 1926 |
| 2,218,540 | Kronquest | Oct. 22, 1940 |
| 2,308,027 | Robinson et al. | Jan. 12, 1943 |